(12) United States Patent
Patel et al.

(10) Patent No.: US 10,019,593 B1
(45) Date of Patent: *Jul. 10, 2018

(54) ACCESS CONTROL SYSTEM FOR IMPLEMENTING ACCESS RESTRICTIONS OF REGULATED DATABASE RECORDS WHILE IDENTIFYING AND PROVIDING INDICATORS OF REGULATED DATABASE RECORDS MATCHING VALIDATION CRITERIA

(71) Applicant: Experian Information Solutions, Inc., Costa Mesa, CA (US)

(72) Inventors: Rakesh Patel, Anaheim Hills, CA (US); Mara Nicholl, Laguna Beach, CA (US); Lindsey Greenwell Harju, Omaha, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,222

(22) Filed: Apr. 5, 2017

Related U.S. Application Data

(63) Continuation of application No. 15/253,743, filed on Aug. 31, 2016, now Pat. No. 9,767,309.

(Continued)

(51) Int. Cl.
*G06F 21/62* (2013.01)
*G06Q 40/02* (2012.01)
(Continued)

(52) U.S. Cl.
CPC ...... *G06F 21/6218* (2013.01); *G06F 17/3053* (2013.01); *G06F 17/30867* (2013.01); *G06Q 40/025* (2013.01); *H04L 63/102* (2013.01)

(58) Field of Classification Search
None
See application file for complete search history.

(56) References Cited

U.S. PATENT DOCUMENTS

| | | |
|---|---|---|
| 4,775,935 A | 10/1988 | Yourick |
| 4,982,346 A | 1/1991 | Girouard et al. |

(Continued)

FOREIGN PATENT DOCUMENTS

| | | |
|---|---|---|
| CN | 1290372 | 5/2001 |
| DE | 91 08 341 | 10/1991 |

(Continued)

OTHER PUBLICATIONS

Bagozzi et al., "On the Evaluation of Structural Equation Models", JAMS, 1988, pp. 74-94.

(Continued)

*Primary Examiner* — Malcolm Cribbs
(74) *Attorney, Agent, or Firm* — Knobbe, Martens, Olson & Bear, LLP

(57) ABSTRACT

A digital targeting system is configured to access data to determine users that satisfy content factors, such as pre-validation criteria, based on user information stored in a database having restrictions on sharing of user data, such as government regulations on sharing of the user information. The digital targeting system may then generate a pre-validated user ID list indicating those users that match the content factors. Users on the pre-validated user ID list may then be matched to users in other databases, such as a digital ID database, to identify digital IDs for the users that are usable by a digital display entity.

20 Claims, 7 Drawing Sheets

Related U.S. Application Data

(60) Provisional application No. 62/259,039, filed on Nov. 23, 2015.

(51) Int. Cl.
*H04L 29/06* (2006.01)
*G06F 17/30* (2006.01)

(56) References Cited

U.S. PATENT DOCUMENTS

| | | |
|---|---|---|
| 5,201,010 A | 4/1993 | Deaton et al. |
| 5,274,547 A | 12/1993 | Zoffel et al. |
| 5,283,731 A | 2/1994 | Lalonde et al. |
| 5,305,195 A | 4/1994 | Murphy |
| 5,325,509 A | 6/1994 | Lautzenheiser |
| 5,454,030 A | 9/1995 | de Oliveira et al. |
| 5,459,306 A | 10/1995 | Stein et al. |
| 5,504,675 A | 4/1996 | Cragun et al. |
| 5,515,098 A | 5/1996 | Carles |
| 5,560,008 A | 9/1996 | Johnson et al. |
| 5,563,783 A | 10/1996 | Stolfo et al. |
| 5,592,560 A | 1/1997 | Deaton et al. |
| 5,627,973 A | 5/1997 | Armstrong et al. |
| 5,629,982 A | 5/1997 | Micali |
| 5,630,127 A | 5/1997 | Moore et al. |
| 5,649,114 A | 7/1997 | Deaton et al. |
| 5,661,516 A | 8/1997 | Carles |
| 5,696,898 A | 12/1997 | Baker et al. |
| 5,696,907 A | 12/1997 | Tom |
| 5,717,923 A | 2/1998 | Dedrick |
| 5,724,521 A | 3/1998 | Dedrick |
| 5,740,549 A | 4/1998 | Reilly et al. |
| 5,745,654 A | 4/1998 | Titan |
| 5,745,694 A | 4/1998 | Egawa et al. |
| 5,774,868 A | 6/1998 | Cragun et al. |
| 5,774,870 A | 6/1998 | Storey |
| 5,819,092 A | 10/1998 | Ferguson et al. |
| 5,819,226 A | 10/1998 | Gopinathan et al. |
| 5,825,884 A | 10/1998 | Zdepski et al. |
| 5,848,396 A | 12/1998 | Gerace |
| 5,857,175 A | 1/1999 | Day et al. |
| 5,864,822 A | 1/1999 | Baker, III |
| 5,870,721 A | 2/1999 | Norris |
| 5,873,068 A | 2/1999 | Beaumont et al. |
| 5,889,799 A | 3/1999 | Grossman et al. |
| 5,889,958 A | 3/1999 | Willens |
| 5,890,140 A | 3/1999 | Clark et al. |
| 5,907,608 A | 5/1999 | Shaffer et al. |
| 5,912,839 A | 6/1999 | Ovshinsky et al. |
| 5,915,243 A | 6/1999 | Smolen |
| 5,924,082 A | 7/1999 | Silverman et al. |
| 5,930,764 A | 7/1999 | Melchione et al. |
| 5,930,776 A | 7/1999 | Dykstra et al. |
| 5,933,813 A | 8/1999 | Teicher et al. |
| 5,944,790 A | 8/1999 | Levy |
| 5,948,061 A | 9/1999 | Merriman et al. |
| 5,953,707 A | 9/1999 | Huang et al. |
| 5,966,695 A | 10/1999 | Melchione et al. |
| 5,974,396 A | 10/1999 | Anderson et al. |
| 5,991,735 A | 11/1999 | Gerace |
| 6,014,688 A | 1/2000 | Venkatraman et al. |
| 6,026,368 A | 2/2000 | Brown et al. |
| 6,029,139 A | 2/2000 | Cunningham et al. |
| 6,044,357 A | 3/2000 | Garg |
| 6,055,573 A | 4/2000 | Gardenswartz et al. |
| 6,061,658 A | 5/2000 | Chou et al. |
| 6,061,691 A | 5/2000 | Fox |
| 6,064,973 A | 5/2000 | Smith et al. |
| 6,070,142 A | 5/2000 | McDonough et al. |
| 6,070,147 A | 5/2000 | Harms et al. |
| 6,078,892 A | 6/2000 | Anderson et al. |
| 6,085,169 A | 7/2000 | Walker et al. |
| 6,101,486 A | 8/2000 | Roberts et al. |
| 6,115,693 A | 9/2000 | McDonough et al. |
| 6,144,948 A | 11/2000 | Walker et al. |
| 6,178,442 B1 | 1/2001 | Yamazaki |
| 6,202,053 B1 | 3/2001 | Christiansen et al. |
| 6,208,979 B1 | 3/2001 | Sinclair |
| 6,209,033 B1 | 3/2001 | Datta et al. |
| 6,233,566 B1 | 5/2001 | Levine et al. |
| 6,236,977 B1 | 5/2001 | Verba et al. |
| 6,289,318 B1 | 9/2001 | Barber |
| 6,298,330 B1 | 10/2001 | Gardenswartz et al. |
| 6,308,210 B1 | 10/2001 | Fields et al. |
| 6,317,752 B1 | 11/2001 | Lee et al. |
| 6,324,566 B1 | 11/2001 | Himmel et al. |
| 6,330,546 B1 | 12/2001 | Gopinathan et al. |
| 6,334,110 B1 | 12/2001 | Walter et al. |
| 6,385,592 B1 | 5/2002 | Angles et al. |
| 6,385,594 B1 | 5/2002 | Lebda et al. |
| 6,412,012 B1 | 6/2002 | Bieganski et al. |
| 6,424,956 B1 | 7/2002 | Werbos |
| 6,442,577 B1 | 8/2002 | Britton et al. |
| 6,460,036 B1 | 10/2002 | Herz |
| 6,477,509 B1 | 11/2002 | Hammons et al. |
| 5,870,721 C1 | 1/2003 | Norris |
| 6,505,168 B1 | 1/2003 | Rothman et al. |
| 6,513,018 B1 | 1/2003 | Culhane |
| 6,549,944 B1 | 4/2003 | Weinberg et al. |
| 6,606,744 B1 | 8/2003 | Mikurak |
| 6,611,816 B2 | 8/2003 | Lebda et al. |
| 6,615,247 B1 | 9/2003 | Murphy |
| 6,623,529 B1 | 9/2003 | Lakritz |
| 6,640,215 B1 | 10/2003 | Galperin et al. |
| 6,665,715 B1 | 12/2003 | Houri |
| 6,671,818 B1 | 12/2003 | Mikurak |
| 6,698,020 B1 | 2/2004 | Zigmond et al. |
| 6,748,426 B1 | 6/2004 | Shaffer et al. |
| 6,757,740 B1 | 6/2004 | Parekh et al. |
| 6,801,909 B2 | 10/2004 | Delgado et al. |
| 6,810,356 B1 | 10/2004 | Garcia-Franco et al. |
| 6,873,979 B2 | 3/2005 | Fishman et al. |
| 6,901,406 B2 | 5/2005 | Nabe et al. |
| 6,915,269 B1 | 7/2005 | Shapiro et al. |
| 6,925,441 B1 | 8/2005 | Jones, III et al. |
| 6,959,281 B1 | 10/2005 | Freeling et al. |
| 6,970,830 B1 | 11/2005 | Samra et al. |
| 6,983,478 B1 | 1/2006 | Grauch et al. |
| 6,993,493 B1 | 1/2006 | Galperin et al. |
| 7,003,792 B1 | 2/2006 | Yuen |
| 7,013,285 B1 | 3/2006 | Rebane |
| 7,023,980 B2 | 4/2006 | Lenard |
| 7,031,945 B1 | 4/2006 | Donner |
| 7,033,792 B2 | 4/2006 | Zhong et al. |
| 7,039,607 B2 | 5/2006 | Watarai et al. |
| 7,047,251 B2 | 5/2006 | Reed et al. |
| 7,050,989 B1 | 5/2006 | Hurt et al. |
| 7,054,828 B2 | 5/2006 | Heching et al. |
| 7,072,853 B2 | 7/2006 | Shkedi |
| 7,072,963 B2 | 7/2006 | Anderson et al. |
| 7,080,027 B2 | 7/2006 | Luby et al. |
| 7,085,734 B2 | 8/2006 | Grant et al. |
| 7,117,172 B1 | 10/2006 | Black |
| 7,136,448 B1 | 11/2006 | Venkataperumal et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,165,037 B2 | 1/2007 | Lazarus et al. |
| 7,185,353 B2 | 2/2007 | Schlack |
| 7,191,144 B2 | 3/2007 | White |
| 7,194,420 B2 | 3/2007 | Ikezawa et al. |
| 7,212,979 B1 | 5/2007 | Matz et al. |
| 7,240,059 B2 | 7/2007 | Bayliss et al. |
| 7,249,048 B1 | 7/2007 | O'Flaherty |
| 7,275,083 B1 | 9/2007 | Seibel et al. |
| 7,296,734 B2 | 11/2007 | Pliha |
| 7,305,364 B2 | 12/2007 | Nabe et al. |
| 7,308,418 B2 | 12/2007 | Malek et al. |
| 7,310,617 B1 | 12/2007 | Cunningham |
| 7,313,538 B2 | 12/2007 | Wilmes et al. |
| 7,313,622 B2 | 12/2007 | Lee et al. |
| 7,314,166 B2 | 1/2008 | Anderson et al. |
| 7,328,169 B2 | 2/2008 | Temares et al. |
| 7,366,694 B2 | 4/2008 | Lazerson |

(56) References Cited

U.S. PATENT DOCUMENTS

| | | | |
|---|---|---|---|
| 7,370,057 B2 | 5/2008 | Burdick et al. |
| 7,376,603 B1 | 5/2008 | Mayr et al. |
| 7,376,714 B1 | 5/2008 | Gerken |
| 7,386,786 B2 | 6/2008 | Davis et al. |
| 7,392,203 B2 | 6/2008 | Edison et al. |
| 7,424,439 B1 | 9/2008 | Fayyad et al. |
| 7,428,526 B2 | 9/2008 | Miller et al. |
| 7,444,302 B2 | 10/2008 | Hu et al. |
| 7,451,095 B1 | 11/2008 | Bradley et al. |
| 7,458,508 B1 | 12/2008 | Shao et al. |
| 7,467,106 B1 * | 12/2008 | Levine | G06Q 10/04 705/14.13 |
| 7,472,088 B2 | 12/2008 | Taylor et al. |
| 7,499,868 B2 | 3/2009 | Galperin et al. |
| 7,529,689 B2 | 5/2009 | Rowan |
| 7,546,266 B2 | 6/2009 | Beirne et al. |
| 7,546,619 B2 | 6/2009 | Anderson et al. |
| 7,556,192 B2 | 7/2009 | Wokaty, Jr. |
| 7,562,184 B2 | 7/2009 | Henmi et al. |
| 7,571,139 B1 | 8/2009 | Giordano et al. |
| 7,580,856 B1 | 8/2009 | Pliha |
| 7,584,126 B1 | 9/2009 | White |
| 7,590,589 B2 | 9/2009 | Hoffberg |
| 7,593,893 B1 | 9/2009 | Ladd et al. |
| 7,606,778 B2 | 10/2009 | Dewar |
| 7,610,257 B1 | 10/2009 | Abrahams |
| 7,617,160 B1 | 11/2009 | Grove et al. |
| 7,653,592 B1 | 1/2010 | Flaxman et al. |
| 7,668,840 B2 | 2/2010 | Bayliss et al. |
| 7,672,865 B2 | 3/2010 | Kumar et al. |
| 7,686,214 B1 | 3/2010 | Shao et al. |
| 7,698,236 B2 | 4/2010 | Cox et al. |
| 7,707,059 B2 | 4/2010 | Reed et al. |
| 7,711,635 B2 | 5/2010 | Steele et al. |
| 7,715,546 B2 | 5/2010 | Pagel et al. |
| 7,720,750 B2 * | 5/2010 | Brody | G06Q 30/02 705/38 |
| 7,725,300 B2 | 5/2010 | Pinto et al. |
| 7,730,509 B2 | 6/2010 | Boulet et al. |
| 7,734,570 B2 | 6/2010 | Bachman et al. |
| 7,742,982 B2 | 6/2010 | Chaudhuri et al. |
| 7,752,236 B2 | 7/2010 | Williams et al. |
| 7,783,515 B1 | 8/2010 | Kumar et al. |
| 7,783,534 B2 | 8/2010 | Armstrong et al. |
| 7,788,147 B2 | 8/2010 | Haggerty et al. |
| 7,793,835 B1 | 9/2010 | Coggeshall et al. |
| 7,814,004 B2 | 10/2010 | Haggerty et al. |
| 7,853,700 B2 | 12/2010 | Lee et al. |
| 7,877,320 B1 | 1/2011 | Downey |
| 7,925,549 B2 | 4/2011 | Looney et al. |
| 7,957,991 B2 | 6/2011 | Mikurak |
| 7,962,404 B1 | 6/2011 | Metzger, II et al. |
| 7,962,501 B1 | 6/2011 | Semprevivo et al. |
| 7,996,521 B2 | 8/2011 | Chamberlain et al. |
| 8,005,712 B2 | 8/2011 | von Davier et al. |
| 8,005,759 B2 | 8/2011 | Hirtenstein et al. |
| 8,006,261 B1 | 8/2011 | Haberman et al. |
| 8,015,045 B2 | 9/2011 | Galperin et al. |
| 8,024,264 B2 | 9/2011 | Chaudhuri et al. |
| 8,027,871 B2 | 9/2011 | Willams et al. |
| 8,027,888 B2 * | 9/2011 | Chandran | G06Q 20/20 705/30 |
| 8,032,409 B1 | 10/2011 | Mikurak |
| 8,078,453 B2 | 12/2011 | Shaw |
| 8,078,524 B2 | 12/2011 | Crawford et al. |
| 8,086,524 B1 | 12/2011 | Craig et al. |
| 8,126,805 B2 | 2/2012 | Sulkowski et al. |
| 8,127,982 B1 | 3/2012 | Casey et al. |
| 8,135,607 B2 | 3/2012 | Willams et al. |
| 8,145,754 B2 | 3/2012 | Chamberlain et al. |
| 8,161,104 B2 | 4/2012 | Tomkow |
| 8,271,313 B2 | 9/2012 | Williams et al. |
| 8,271,378 B2 | 9/2012 | Chaudhuri et al. |
| 8,280,805 B1 | 10/2012 | Abrahams et al. |
| 8,285,577 B1 | 10/2012 | Galperin et al. |
| 8,285,656 B1 | 10/2012 | Chang et al. |
| 8,296,229 B1 | 10/2012 | Yellin et al. |
| 8,301,574 B2 | 10/2012 | Kilger et al. |
| 8,346,593 B2 | 1/2013 | Fanelli |
| 8,386,377 B1 | 2/2013 | Xiong et al. |
| 8,392,334 B2 | 3/2013 | Hirtenstein et al. |
| 8,412,593 B1 | 4/2013 | Song et al. |
| 8,458,062 B2 | 6/2013 | Dutt et al. |
| 8,468,198 B2 | 6/2013 | Tomkow |
| 8,515,828 B1 | 8/2013 | Wolf et al. |
| 8,515,862 B2 | 8/2013 | Zhang et al. |
| 8,533,038 B2 | 9/2013 | Bergh et al. |
| 8,533,322 B2 | 9/2013 | Chamberlain et al. |
| 8,560,434 B2 | 10/2013 | Morris et al. |
| 8,560,666 B2 | 10/2013 | Low |
| 8,566,167 B2 | 10/2013 | Munjal |
| 8,606,626 B1 | 12/2013 | DeSoto et al. |
| 8,620,740 B2 | 12/2013 | Bergh et al. |
| 8,626,563 B2 | 1/2014 | Williams et al. |
| 8,630,929 B2 | 1/2014 | Haggerty et al. |
| 8,639,920 B2 | 1/2014 | Stack et al. |
| 8,732,004 B1 | 5/2014 | Ramos et al. |
| 8,738,515 B2 | 5/2014 | Chaudhuri et al. |
| 8,966,649 B2 | 2/2015 | Stack et al. |
| 9,058,340 B1 | 6/2015 | Chamberlain et al. |
| 9,152,727 B1 | 10/2015 | Balducci et al. |
| 9,471,928 B2 | 10/2016 | Fanelli et al. |
| 9,595,051 B2 | 3/2017 | Stack et al. |
| 2001/0014868 A1 | 8/2001 | Herz et al. |
| 2001/0039523 A1 | 11/2001 | Iwamoto |
| 2002/0004754 A1 | 1/2002 | Gardenswartz et al. |
| 2002/0023051 A1 | 2/2002 | Kunzle et al. |
| 2002/0029162 A1 | 3/2002 | Mascarenhas |
| 2002/0046099 A1 | 4/2002 | Frengut et al. |
| 2002/0046105 A1 | 4/2002 | Gardenswartz et al. |
| 2002/0049968 A1 | 4/2002 | Wilson et al. |
| 2002/0051020 A1 | 5/2002 | Ferrari et al. |
| 2002/0055906 A1 | 5/2002 | Katz et al. |
| 2002/0069203 A1 | 6/2002 | Dar et al. |
| 2002/0077964 A1 | 6/2002 | Brody et al. |
| 2002/0082892 A1 | 6/2002 | Raffel et al. |
| 2002/0083043 A1 | 6/2002 | Hoshi et al. |
| 2002/0099641 A1 | 7/2002 | Mills et al. |
| 2002/0099824 A1 | 7/2002 | Bender et al. |
| 2002/0099936 A1 | 7/2002 | Kou et al. |
| 2002/0116253 A1 | 8/2002 | Coyne et al. |
| 2002/0120504 A1 | 8/2002 | Gould et al. |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0129368 A1 | 9/2002 | Schlack et al. |
| 2002/0133404 A1 | 9/2002 | Pedersen |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0147669 A1 | 10/2002 | Taylor et al. |
| 2002/0147695 A1 | 10/2002 | Khedkar et al. |
| 2002/0161664 A1 | 10/2002 | Shaya et al. |
| 2002/0169655 A1 | 11/2002 | Beyer et al. |
| 2003/0018769 A1 | 1/2003 | Foulger et al. |
| 2003/0023489 A1 | 1/2003 | McGuire et al. |
| 2003/0033242 A1 | 2/2003 | Lynch et al. |
| 2003/0041050 A1 | 2/2003 | Smith et al. |
| 2003/0046222 A1 | 3/2003 | Bard et al. |
| 2003/0060284 A1 | 3/2003 | Hamalainen et al. |
| 2003/0065563 A1 | 4/2003 | Elliott et al. |
| 2003/0093311 A1 | 5/2003 | Knowlson |
| 2003/0110293 A1 | 6/2003 | Friedman et al. |
| 2003/0120591 A1 | 6/2003 | Birkhead et al. |
| 2003/0144950 A1 | 7/2003 | O'Brien et al. |
| 2003/0158776 A1 | 8/2003 | Landesmann |
| 2003/0167222 A1 | 9/2003 | Mehrotra et al. |
| 2003/0200135 A1 | 10/2003 | Wright |
| 2003/0216965 A1 | 11/2003 | Libman |
| 2003/0229507 A1 | 12/2003 | Perge |
| 2003/0229892 A1 | 12/2003 | Sardera |
| 2003/0233278 A1 | 12/2003 | Marshall |
| 2003/0233323 A1 | 12/2003 | Bilski et al. |
| 2003/0233655 A1 | 12/2003 | Gutta et al. |

(56) References Cited

U.S. PATENT DOCUMENTS

| | | |
|---|---|---|
| 2004/0024848 A1 | 2/2004 | Smith |
| 2004/0039688 A1 | 2/2004 | Sulkowski et al. |
| 2004/0049729 A1 | 3/2004 | Penfield |
| 2004/0059626 A1 | 3/2004 | Smallwood |
| 2004/0062213 A1 | 4/2004 | Koss |
| 2004/0078809 A1 | 4/2004 | Drazin |
| 2004/0083215 A1 | 4/2004 | de Jong |
| 2004/0098625 A1 | 5/2004 | Lagadec et al. |
| 2004/0102197 A1 | 5/2004 | Dietz |
| 2004/0107125 A1 | 6/2004 | Guheen et al. |
| 2004/0122730 A1 | 6/2004 | Tucciarone et al. |
| 2004/0122735 A1 | 6/2004 | Meshkin |
| 2004/0128193 A1 | 7/2004 | Brice et al. |
| 2004/0128236 A1 | 7/2004 | Brown et al. |
| 2004/0138932 A1 | 7/2004 | Johnson et al. |
| 2004/0139025 A1 | 7/2004 | Coleman |
| 2004/0153509 A1 | 8/2004 | Alcorn et al. |
| 2004/0163101 A1 | 8/2004 | Swix |
| 2004/0176995 A1 | 9/2004 | Fusz |
| 2004/0199456 A1 | 10/2004 | Flint et al. |
| 2004/0199584 A1 | 10/2004 | Kirshenbaum et al. |
| 2004/0199789 A1 | 10/2004 | Shaw et al. |
| 2004/0205157 A1 | 10/2004 | Bibelnieks et al. |
| 2004/0230820 A1 | 11/2004 | Hui Hsu et al. |
| 2004/0261116 A1 | 12/2004 | Mckeown et al. |
| 2005/0021397 A1 | 1/2005 | Cui et al. |
| 2005/0050027 A1 | 3/2005 | Yeh et al. |
| 2005/0065809 A1 | 3/2005 | Henze |
| 2005/0091077 A1 | 4/2005 | Reynolds |
| 2005/0097039 A1 | 5/2005 | Kulcsar et al. |
| 2005/0120045 A1 | 6/2005 | Klawon |
| 2005/0144067 A1 | 6/2005 | Farahat et al. |
| 2005/0144641 A1 | 6/2005 | Lewis |
| 2005/0177489 A1 | 8/2005 | Neff et al. |
| 2005/0192008 A1 | 9/2005 | Desai et al. |
| 2005/0201272 A1 | 9/2005 | Wang et al. |
| 2005/0204381 A1 | 9/2005 | Ludvig et al. |
| 2005/0209922 A1* | 9/2005 | Hofmeister ........ G06Q 30/0224 705/14.25 |
| 2005/0222900 A1 | 10/2005 | Fuloria et al. |
| 2005/0222906 A1 | 10/2005 | Chen |
| 2005/0233742 A1 | 10/2005 | Karaoguz et al. |
| 2005/0234969 A1 | 10/2005 | Mamou et al. |
| 2005/0251820 A1 | 11/2005 | Stefanik et al. |
| 2005/0257250 A1 | 11/2005 | Mitchell et al. |
| 2005/0273849 A1 | 12/2005 | Araujo et al. |
| 2005/0278246 A1 | 12/2005 | Friedman et al. |
| 2005/0278743 A1 | 12/2005 | Flickinger et al. |
| 2005/0288954 A1 | 12/2005 | McCarthy et al. |
| 2006/0004626 A1 | 1/2006 | Holmen et al. |
| 2006/0004731 A1 | 1/2006 | Seibel et al. |
| 2006/0020611 A1 | 1/2006 | Gilbert et al. |
| 2006/0041443 A1 | 2/2006 | Horvath |
| 2006/0041500 A1 | 2/2006 | Diana et al. |
| 2006/0053047 A1 | 3/2006 | Garcia et al. |
| 2006/0059073 A1 | 3/2006 | Walzak |
| 2006/0080233 A1 | 4/2006 | Mendelovich et al. |
| 2006/0080251 A1 | 4/2006 | Fried et al. |
| 2006/0089914 A1 | 4/2006 | Shiel et al. |
| 2006/0095363 A1 | 5/2006 | May |
| 2006/0100954 A1 | 5/2006 | Schoen |
| 2006/0122921 A1 | 6/2006 | Comerford et al. |
| 2006/0155639 A1 | 7/2006 | Lynch et al. |
| 2006/0168068 A1 | 7/2006 | Ziegert |
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0195866 A1 | 8/2006 | Thukral |
| 2006/0206379 A1 | 9/2006 | Rosenberg |
| 2006/0206416 A1 | 9/2006 | Farias |
| 2006/0212350 A1 | 9/2006 | Ellis et al. |
| 2006/0212353 A1 | 9/2006 | Roslov et al. |
| 2006/0218079 A1 | 9/2006 | Goldblatt et al. |
| 2006/0224696 A1 | 10/2006 | King et al. |
| 2006/0229943 A1 | 10/2006 | Mathias et al. |
| 2006/0229996 A1 | 10/2006 | Keithley et al. |
| 2006/0230415 A1 | 10/2006 | Roeding |
| 2006/0242046 A1 | 10/2006 | Haggerty et al. |
| 2006/0242050 A1 | 10/2006 | Haggerty et al. |
| 2006/0253323 A1 | 11/2006 | Phan et al. |
| 2006/0259364 A1 | 11/2006 | Strock et al. |
| 2006/0276171 A1 | 12/2006 | Pousti |
| 2006/0277102 A1 | 12/2006 | Agliozzo |
| 2006/0282328 A1 | 12/2006 | Gerace et al. |
| 2006/0282856 A1 | 12/2006 | Errico et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0016518 A1 | 1/2007 | Atkinson et al. |
| 2007/0022032 A1 | 1/2007 | Anderson et al. |
| 2007/0027791 A1 | 2/2007 | Young et al. |
| 2007/0033227 A1 | 2/2007 | Gaito et al. |
| 2007/0038516 A1 | 2/2007 | Apple et al. |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0078835 A1 | 4/2007 | Donnelli |
| 2007/0121843 A1 | 5/2007 | Atazky et al. |
| 2007/0129993 A1 | 6/2007 | Alvin |
| 2007/0156515 A1 | 7/2007 | Hasselback et al. |
| 2007/0156589 A1 | 7/2007 | Zimler et al. |
| 2007/0157110 A1 | 7/2007 | Gandhi et al. |
| 2007/0169189 A1 | 7/2007 | Crespo et al. |
| 2007/0174122 A1 | 7/2007 | Howard et al. |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0220553 A1 | 9/2007 | Branam et al. |
| 2007/0220611 A1 | 9/2007 | Socolow et al. |
| 2007/0233857 A1 | 10/2007 | Cheng et al. |
| 2007/0244732 A1 | 10/2007 | Chatterji et al. |
| 2007/0271178 A1 | 11/2007 | Davis et al. |
| 2007/0271582 A1 | 11/2007 | Ellis et al. |
| 2007/0282684 A1 | 12/2007 | Prosser et al. |
| 2007/0288271 A1 | 12/2007 | Klinkhammer |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0294163 A1 | 12/2007 | Harmon et al. |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010206 A1 | 1/2008 | Coleman |
| 2008/0021802 A1 | 1/2008 | Pendleton |
| 2008/0028067 A1 | 1/2008 | Berkhin et al. |
| 2008/0040216 A1 | 2/2008 | Dellovo |
| 2008/0059317 A1 | 3/2008 | Chandran et al. |
| 2008/0059352 A1 | 3/2008 | Chandran |
| 2008/0065774 A1 | 3/2008 | Keeler |
| 2008/0086368 A1 | 4/2008 | Bauman et al. |
| 2008/0091535 A1 | 4/2008 | Heiser et al. |
| 2008/0097928 A1 | 4/2008 | Paulson |
| 2008/0120155 A1 | 5/2008 | Pliha |
| 2008/0126476 A1 | 5/2008 | Nicholas et al. |
| 2008/0133325 A1 | 6/2008 | De et al. |
| 2008/0134042 A1 | 6/2008 | Jankovich |
| 2008/0140476 A1 | 6/2008 | Anand et al. |
| 2008/0167956 A1 | 7/2008 | Keithley |
| 2008/0177836 A1 | 7/2008 | Bennett |
| 2008/0183564 A1 | 7/2008 | Tien et al. |
| 2008/0184289 A1 | 7/2008 | Cristofalo et al. |
| 2008/0208548 A1 | 8/2008 | Metzger et al. |
| 2008/0215470 A1 | 9/2008 | Sengupta et al. |
| 2008/0222127 A1 | 9/2008 | Bergin |
| 2008/0228578 A1 | 9/2008 | Mashinsky |
| 2008/0228635 A1 | 9/2008 | Megdal et al. |
| 2008/0255897 A1 | 10/2008 | Megdal et al. |
| 2008/0294540 A1 | 11/2008 | Celka et al. |
| 2008/0294546 A1 | 11/2008 | Flannery |

(56) References Cited

U.S. PATENT DOCUMENTS

| | | |
|---|---|---|
| 2008/0301727 A1 | 12/2008 | Cristofalo et al. |
| 2009/0006475 A1 | 1/2009 | Udezue et al. |
| 2009/0018996 A1 | 1/2009 | Hunt et al. |
| 2009/0024462 A1 | 1/2009 | Lin |
| 2009/0044246 A1 | 2/2009 | Sheehan et al. |
| 2009/0076883 A1 | 3/2009 | Kilger et al. |
| 2009/0089205 A1 | 4/2009 | Bayne |
| 2009/0094640 A1 | 4/2009 | Anderson et al. |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0132347 A1 | 5/2009 | Anderson et al. |
| 2009/0132559 A1 | 5/2009 | Chamberlain et al. |
| 2009/0132691 A1 | 5/2009 | Daurensan et al. |
| 2009/0133058 A1 | 5/2009 | Kouritzin et al. |
| 2009/0144102 A1 | 6/2009 | Lopez |
| 2009/0144201 A1 | 6/2009 | Gierkink et al. |
| 2009/0164293 A1 | 6/2009 | Coley |
| 2009/0172035 A1 | 7/2009 | Lessing et al. |
| 2009/0177480 A1 | 7/2009 | Chen et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234708 A1 | 9/2009 | Heiser, II et al. |
| 2009/0234715 A1 | 9/2009 | Heiser, II et al. |
| 2009/0249440 A1 | 10/2009 | Platt et al. |
| 2009/0288109 A1 | 11/2009 | Downey et al. |
| 2009/0313163 A1 | 12/2009 | Wang et al. |
| 2009/0319648 A1 | 12/2009 | Dutta et al. |
| 2010/0010935 A1 | 1/2010 | Shelton |
| 2010/0017300 A1 | 1/2010 | Bramlage et al. |
| 2010/0030649 A1 | 2/2010 | Ubelhor |
| 2010/0037255 A1 | 2/2010 | Sheehan et al. |
| 2010/0094704 A1 | 4/2010 | Subramanian et al. |
| 2010/0094758 A1 | 4/2010 | Chamberlain et al. |
| 2010/0114663 A1 | 5/2010 | Casas et al. |
| 2010/0138290 A1 | 6/2010 | Zschocke et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0191598 A1 | 7/2010 | Toennis et al. |
| 2010/0211445 A1 | 8/2010 | Bodington |
| 2010/0268660 A1 | 10/2010 | Ekdahl |
| 2010/0332381 A1* | 12/2010 | Celka .................. G06Q 40/00 705/38 |
| 2011/0023115 A1 | 1/2011 | Wright |
| 2011/0029388 A1 | 2/2011 | Kendall et al. |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078018 A1 | 3/2011 | Chunilal |
| 2011/0078073 A1 | 3/2011 | Annappindi et al. |
| 2011/0093327 A1 | 4/2011 | Fordyce, III et al. |
| 2011/0125595 A1 | 5/2011 | Neal et al. |
| 2011/0137789 A1 | 6/2011 | Kortina et al. |
| 2011/0164746 A1 | 7/2011 | Nice et al. |
| 2011/0178899 A1 | 7/2011 | Huszar |
| 2011/0208578 A1 | 8/2011 | Bergh et al. |
| 2011/0211445 A1 | 9/2011 | Chen |
| 2011/0213641 A1 | 9/2011 | Metzger, II et al. |
| 2011/0219421 A1 | 9/2011 | Ullman et al. |
| 2011/0258050 A1 | 10/2011 | Chan et al. |
| 2011/0264581 A1 | 10/2011 | Clyne |
| 2011/0270618 A1 | 11/2011 | Banerjee et al. |
| 2011/0270661 A1 | 11/2011 | Heiser, II et al. |
| 2011/0282739 A1 | 11/2011 | Mashinsky et al. |
| 2011/0307397 A1 | 12/2011 | Benmbarek |
| 2012/0011056 A1 | 1/2012 | Ward et al. |
| 2012/0011068 A1 | 1/2012 | Dearing et al. |
| 2012/0011158 A1 | 1/2012 | Avner et al. |
| 2012/0016733 A1 | 1/2012 | Belvin et al. |
| 2012/0016948 A1 | 1/2012 | Sinha |
| 2012/0047219 A1 | 2/2012 | Feng et al. |
| 2012/0054592 A1 | 3/2012 | Jaffe et al. |
| 2012/0060207 A1 | 3/2012 | Mardikar et al. |
| 2012/0066065 A1 | 3/2012 | Switzer |
| 2012/0101892 A1 | 4/2012 | LeFebvre |
| 2012/0110677 A1 | 5/2012 | Abendroth et al. |
| 2012/0143921 A1 | 6/2012 | Wilson |
| 2012/0179536 A1 | 7/2012 | Kalb et al. |
| 2012/0203639 A1 | 8/2012 | Webster et al. |
| 2012/0239497 A1 | 9/2012 | Nuzzi |
| 2012/0239515 A1 | 9/2012 | Batra et al. |
| 2013/0080242 A1 | 3/2013 | Alhadeff et al. |
| 2013/0080467 A1 | 3/2013 | Carson et al. |
| 2013/0085804 A1 | 4/2013 | Leff et al. |
| 2013/0117832 A1 | 5/2013 | Gandhi |
| 2013/0132151 A1 | 5/2013 | Stibel et al. |
| 2013/0218638 A1 | 8/2013 | Kilger et al. |
| 2013/0262226 A1 | 10/2013 | LaChapelle et al. |
| 2013/0293363 A1 | 11/2013 | Plymouth |
| 2013/0332230 A1 | 12/2013 | Fanelli et al. |
| 2013/0339143 A1 | 12/2013 | Drozd et al. |
| 2014/0025815 A1 | 1/2014 | Low |
| 2014/0032265 A1 | 1/2014 | Paprocki et al. |
| 2014/0046887 A1 | 2/2014 | Lessin |
| 2014/0058818 A1 | 2/2014 | Drozd et al. |
| 2014/0096249 A1 | 4/2014 | Dupont et al. |
| 2014/0164112 A1 | 6/2014 | Kala |
| 2014/0164398 A1 | 6/2014 | Smith et al. |
| 2014/0214482 A1 | 7/2014 | Williams et al. |
| 2014/0279420 A1* | 9/2014 | Okerlund .............. G06Q 40/00 705/39 |
| 2015/0095104 A1 | 4/2015 | Goldberg |
| 2015/0128240 A1* | 5/2015 | Richards ............ H04L 63/0861 726/7 |
| 2015/0128287 A1 | 5/2015 | LaFever |
| 2015/0262246 A1 | 9/2015 | Stack et al. |
| 2015/0262248 A1 | 9/2015 | Chaouki et al. |
| 2015/0348200 A1* | 12/2015 | Fair .................. G06Q 40/06 705/36 R |
| 2016/0371740 A1 | 12/2016 | Heiser, II et al. |
| 2017/0032393 A1 | 2/2017 | Fanelli et al. |

FOREIGN PATENT DOCUMENTS

| | | |
|---|---|---|
| EP | 0 554 083 | 8/1993 |
| EP | 0 749 081 | 12/1996 |
| EP | 1 028 401 | 8/2000 |
| EP | 1 122 664 | 8/2001 |
| JP | 10-293732 | 11/1998 |
| JP | 11-068828 | 3/1999 |
| WO | WO 91/003789 | 3/1991 |
| WO | WO 94/006103 | 3/1994 |
| WO | WO 96/042041 | 12/1996 |
| WO | WO 97/023838 | 7/1997 |
| WO | WO 98/041913 | 9/1998 |
| WO | WO 98/049643 | 11/1998 |
| WO | WO 98/057285 | 12/1998 |
| WO | WO 99/004350 | 1/1999 |
| WO | WO 99/022328 | 5/1999 |
| WO | WO 99/032985 | 7/1999 |
| WO | WO 99/033012 | 7/1999 |
| WO | WO 99/037066 | 7/1999 |
| WO | WO 99/059375 | 11/1999 |
| WO | WO 99/067731 | 12/1999 |
| WO | WO 00/055789 | 9/2000 |
| WO | WO 00/055790 | 9/2000 |
| WO | WO 00/068862 | 11/2000 |
| WO | WO 01/010090 | 2/2001 |
| WO | WO 01/011522 | 2/2001 |
| WO | WO 01/075754 | 10/2001 |
| WO | WO 02/013025 | 2/2002 |
| WO | WO 03/101123 | 12/2003 |
| WO | WO 2006/110873 | 10/2006 |
| WO | WO 2007/149941 | 12/2007 |
| WO | WO 2008/022289 | 2/2008 |
| WO | WO 2008/127288 | 10/2008 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |

(56) References Cited

FOREIGN PATENT DOCUMENTS

| WO | WO 2010/150251 | 12/2010 |
|----|----------------|---------|
| WO | WO 2011/005876 | 1/2011  |
| WO | WO 2014/018900 | 1/2014  |

OTHER PUBLICATIONS

Davis et al., "User Acceptance of Computer Technology: A Comparison of Two Theoretical Models", Management Science, Aug. 1989, vol. 35, No. 8, pp. 982-1003.
Dolnicar, Sara, "Using Cluster Analysis for Market Segmentation—Typical Misconceptions, Established Methodological Weaknesses and Some Recommendations for Improvement," Australasian Journal of Market Research, 2003, vol. 11, No. 2, pp. 5-12.
Punj et al., "Cluster Analysis in Marketing Research: Review and Suggestions for Application," Journal of Marketing Research, May 1983, vol. 20, No. 2, pp. 134-148.
Warshaw, Paul R., "A New Model for Predicting Behavioral Intentions: An Alternative to Fishbein", Journal of Marketing Research, May 1980, vol. XVII, pp. 153-172.
Yun et al., "An Efficient Clustering Algorithm for Market Basket Data Based on Small Large Ratios," Computer Software and Applications Conference, Oct. 2001, pp. 505-510.
U.S. Appl. No. 15/253,743, filed Aug. 31, 2016, Access Control System for Implementing Access Restrictions of Regulated Database Records While Identifying and Providing Indicators of Regulated Database Records Matching Validation Criteria.
U.S. Appl. No. 12/705,489, filed Feb. 12, 2010, Bargoli et al.
U.S. Appl. No. 12/705,511, filed Feb. 12, 2010, Bargoli et al.
"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=428.
"Aggregate and Analyze Social Media Content: Gain Faster and Broader Insight to Market Sentiment," SAP Partner, Mantis Technology Group, Apr. 2011, pp. 4.
Akl, Selim G., "Digital Signatures: A Tutorial Survey," Computer, Feb. 1983, pp. 15-24.
"Atlas On Demand, Concurrent, and Everstream Strike Video-On-Demand Advertising Alliance", www.atlassolutions.com, Jul. 13, 2006, 3 pages.
"Arbitron 2006 Black Consumers," Arbitron Inc., lvtsg.com, Jul. 8, 2006, 2 pages, http://www.lvtsg.com/news/publish/Factoids/article_3648.shtml.
"Atlas On Demand and C-COR Join Forces to Offer Advertising Management Solution for On Demand TV: Global Provider of On Demand Systems Partners with Atlas to Develop and Market Comprehensive VOD Advertising Solution," www.atlassolutions.com, Jul. 25, 2005, 3 pages.
"Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006—3 pages, http://www.atlassolutions.com/news_20060622.aspx.
ADZILLA, Press Release, "ZILLACASTING Technology Approved and Patent Pending," http://www.adzilla.com/newsroom/pdf/patent_051605.pdf, May 16, 2005, pp. 2.
AFX New Limited—AFX International Focus, "Nielsen moving to measure off—TV viewing," Jun. 14, 2006, 1 page.
Applied Geographic Solutions, "What is MOSAIC™", as captured Feb. 15, 2004 from http://web.archive.org/web/20040215224329/http://www.appliedgeographic.com/mosaic.html in 2 pages.
Axiom, "Capabilites", http://www.axiomcom.com/capabilities/, printed May 7, 2015 in 2 pages.

Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.
"Bank of America Direct Web-Based Network Adds Core Functionality to Meet Day-To-Day Treasury Needs", Business Wire, Oct. 25, 1999. pp. 2.
"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.
Bitran et al., "Mailing Decisions in Catalog Sales Industry", Management Science (JSTOR), vol. 42, No. 9, pp. 1364-1381, Sep. 1996.
Blackbaud.com, www.blackbaud.com, various pages, retrieved Jan. 22, 2009 from www.archive.org, 23 pages.
Brown et al., "ALCOD IDSS:Assisting the Australian Stock Market Surveillance Team's Review Process," Applied Artificial Intelligence Journal, Dec. 1, 1996, pp. 625-641.
Bult et al., "Optimal Selection for Direct Mail," Marketing Science, 1995, vol. 14, No. 4, pp. 378-394.
Burr Ph.D., et al., "Utility Payments as Alternative Credit Data: A Reality Check", Asset Builders of America, Inc., Oct. 5, 2006, pp. 1-18, Washington, D.C.
"Cable Solution Now, The Industry Standard for Information Management: Strata's TIM.net Crosses Important Threshold Dominant Solution for All Top 20 TV Markets," stratag.com, Apr. 28, 2006, 1 page, http://stratag.com/news/cablepress042806.html.
Caliendo, et al., "Some Practical Guidance for the Implementation of Propensity Score Matching", IZA:Discussion Paper Series, No. 1588, Germany, May 2005, pp. 32.
Card Marketing, Use the Latest CRM Tools and Techniques, www.CardForum.com, vol. 5 No. 10, Dec. 2001.
ChannelWave.com, PRM Central—About PRM, http://web.archive.org/web/20000510214859/http://www.channelwave.com as printed on Jun. 21, 2006, May 2000 Archive.
"Chase Gets Positive," Bank Technology News, May 6, 2000, vol. 14, No. 5, p. 33.
Chung, Charles; Internet Retailer, "Multi-channel retailing requires the cleanest data—but don't expect it from the customer", Jan./Feb. 2002.
"Claritas Forms Life Insurance Consortium with Worldwide Financial Services Association: Initiative with LIMRA International is First of its Kind to Provide Actual Sales Information at Small Geographic Areas," Feb. 9, 2006, 3 pages, http://www.claritas.com/claritas/Default/jsp?ci=5&si=1&pn=limra.
"Claritas Introduces PRIZM NE Consumer Electronic Monitor Profiles: New Information Product Provides Insight Into the Public's Purchasing Behaviors of Consumer Electronics," May 30, 2006, 3 pages.
"Cole Taylor Bank Chooses Integrated E-Banking/E-Payments/Reconciliation Solution From Fundtech", Business Wire, Oct. 21, 1999, pp. 2.
Click Z, "ISPs Collect User Data for Behavioral Ad Targeting," dated Jan. 3, 2008, printed from http://www.clickz.com/showPage.html?page=clickz Apr. 16, 2008.
CNET news.com, "Target me with your ads, please," dated Dec. 5, 2007, printed from http://www.news.com/2102-1024_3-6221241.html?tag+st.util.print Mar. 18, 2008.
Creamer, Matthew; Consulting in marketing; Accenture, Others Playing Role in Firms' Processes, Crain's Chicago Business, Jun. 12, 2006, 2 pages.
Culhane, Patrick, "Data: Powerfully Linking Service and Profitability," Jul./Aug. 1996, Bank Management, vol. 72, No. 4, pp. 8-12.
"Database Marketing: A new Approach to the Old Relationships," Chain Storage Executive Edition, Dialogue, Sep. 1991, pp. 2.
Davies, Donald W., "Applying the RSA Digital Signature to Electronic Mail," Computer, Feb. 1983, pp. 55-62.
deGruchy, et al., "Geodemographic Profiling Benefits Stop-Smoking Service;" The British Journal of Healthcare Computing & Information Management; Feb. 2007; 24, 7; pp. 29-31.

(56) References Cited

OTHER PUBLICATIONS

Delany et al., "Firm Mines Offline Data to Target Online", http://web.archive.org/web/20071117140456/http://www.commercialalert.org/news/archive/2007/10/firm-mines-offline-data-to-target-online-ads, Commercial Alert, Oct. 17, 2007, pp. 3.
demographicsnow.com, sample reports, "Age Rank Report", Jul. 17, 2006, 3 pages.
demographicsnow.com, sample reports, "Consumer Expenditure Summary Report", Jul. 17, 2006, 3 pages.
demographicsnow.com, sample reports, "Income Comparison Report", Jul. 17, 2006, 4 pages.
Downey, Sarah A., "Smile, you're on Spokeo.com! Concerned? (here's what to do)", https://www.abine.com/blog/2011/how-to-remove-yourself-from-spokeo/, as posted Jan. 13, 2011 in 7 pages.
Drawbridge, "Customer Success", http://www.drawbrid.ge/customer-success, printed May 7, 2015 in 17 pages.
Drawbridge, "Solutions", http://www.drawbrid.ge/solutions, printed May 7, 2015 in 5 pages.
Drawbridge, "Technology", http://www.drawbrid.ge/technology, printed May 7, 2015 in 3 pages.
Dstillery, "Products", http://dstillery.com/how-we-do-it/products/, printed May 7, 2015 in 2 pages.
Dstillery, "What We Do", http://dstillery.com/what-we-do/, printed May 7, 2015 in 2 pages.
Dstillery, "Who We Are", http://dstillery.com/who-we-are/, printed May 7, 2015 in 2 pages.
Dymi, Amilda, Need for Leads Spurs Some Upgrades, Origination News-Special Report, May 1, 2008, vol. vol. 17, Issue No. 8, pp. p. 24, Atlanta, Copyright 2008 SourceMedia, Inc.
Egol, Len; "What's New in Database Marketing Software," Direct, Aug. 1994, vol. 6, No. 8, pp. 39.
"Epsilon Leads Discussion on Paradigm Shift in TV Advertising," epsilon.com, Jun. 24, 2004, 2 pages, http://www.epsilon.com/who-pr_tvad040624.html.
Experian and AGS Select SRC to Deliver Complete Marketing Solutions; Partnership First to Marketplace with Census2000 Data. PR Newswire. New York: Mar. 21, 2001. p. 1.
"Experian Launches Portfolio Monitor—Owner NoticesSM", News Release, Feb. 2003, Costa Mesa, CA.
Fanelli, Marc, "Building a Holistic Customer View", MultiChannel Merchant, Jun. 26, 2006, pp. 2.
Findermind, "PeopleFinders Review", as archived Jun. 1, 2012 in 4 pages. http://web.archive.org/web/20120601010134/http://www.findermind.com/tag/peoplefinders-review/.
Frontporch, "Ad Networks-Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
"FTC Testifies: Identity Theft on the Rise", FTC News Release, Mar. 7, 2000, pp. 3.
Georges, et al., "KDD'99 Competition: Knowledge Discovery Contest", SAS Institute, 1999, 6 pages.
Gilje, Shelby, "Keeping Tabs on Businesses That Keep Tabs on Us", NewsRoom, The Seattle Times, Section: SCENE, Apr. 19, 1995, pp. 4.
Gonul, et al., "Optimal Mailing of Catalogs: A New Methodology Using Estimable Structural Dynamic Programming Models", 14 pages, Management Science, vol. 44, No. 9, Sep. 1998.
Halliday, Jean, "Ford Recruits Accenture for Marketing Plan," Automotive News Feb. 13, 2006, 2 pages, Crain Communications.
Hartfeil, Guenther, "Bank One Measures Profitability of Customers, Not Just Products", Journal of Retail Banking Services, Aug. 1996, vol. 18, No. 2, pp. 23-29.
Haughton et al., "Direct Marketing Modeling with CART and CHAID", Journal of Direct Marketing, Fall 1997, vol. 11, No. 4, pp. 42-52.
Helm, Burt, "Nielsen's New Ratings Yardstick", businessweek.com, Jun. 20, 2006, 3 pages, http://www.businessweek.com/technology/content/jun2006/tc20060620_054223.htm.
Hill, Kerry, "Identity Theft Your Social Security Number Provides Avenue for Thieves", NewsRoom, Wisconsin State Journal, Sep. 13, 1998, pp. 4.
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.
Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/page/news/pr/pr_archive?mode=single&pr_id=117, printed Oct. 4, 2007 in 2 pages.
"Intelligent Miner Applications Guide", IBM Corp., Apr. 2, 1999, Chapters 4-7, pp. 33-132.
"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.
Jost, Allen; Neural Networks, Credit World, Mar./Apr. 1993, vol. 81, No. 4, pp. 26-33.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Lamons, Bob, "Be Smart: Offer Inquiry Qualification Services," Marketing News, ABI/Inform Global, Nov. 6, 1995, vol. 29, No. 23, pp. 13.
LeadVerifier: Why Should You Use LeadVerifier?, downloaded from www.leadverifier.com/LeadVerifier_Why.asp, dated Feb. 7, 2006 on www.archive.org.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
LifeLock, http://web.archive.org/web/20110724011010/http://www.lifelock.com/? as archived Jul. 24, 2011 in 1 page.
Littwin, Angela, "Beyond Usury: A Study of Credit-Card Use and Preference Among Low-Income Consumers", Texas Law Review, vol. 86, No. 3, pp. 451-506; Feb. 2008.
Longo, Tracey, "Managing Money: Your Family Finances", Kiplinger's Personal Finance Magazine, Jun. 1, 1995, vol. 49, No. 6, pp. 4.
Loshin, Intelligent Enterprise: Better Insight for Business Decisions, "Value-Added Data: Merge Ahead", Feb. 9, 2000, vol. 3, No. 3, 5 pages.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.
Morrissey, Brian, "Aim High: Ad Targeting Moves to the Next Level", ADWEEK, dated Jan. 21, 2008 as downloaded from http://www.adweek.com/aw/magazine/article_display.isp?vnu on Apr. 16, 2008.
Muus, et al., "A Decision Theoretic Framework for Profit Maximization in Direct Marketing", Sep. 1996, pp. 20.
NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
"New Privista Product Provides Early Warning System to Combat Identity Theft", PR Newswire, Oct. 24, 2000, PR Newswire Association, Inc., New York.
Otter, et al., "Direct Mail Selection by Joint Modeling of the Probability and Quantity of Response", Jun. 1997, pp. 14.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.

(56) References Cited

OTHER PUBLICATIONS

"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
PR Web: Press Release Newswire, Anchor Launches LeadVerifier to Verify, Correct and Enhance Internet Leads, Jul. 19, 2005, pp. 2 pages, Farmingdale, NY.
Predictive Behavioral Targeting http://www.predictive-behavioral-targeting.com/index.php.Main_Page as printed Mar. 28, 2008 in 4 pages.
PrivacyGuard, http://web.archive.org/web/20110728114049/http://www.privacyguard.com/ as archived Jul. 28, 2011 in 1 page.
Reinbach, Andrew; MCIF aids banks in CRA Compliance, Bank Systems & Technology, Aug. 1995, vol. vol. 32, Issue No. 8, pp. pp. 27.
Rossi et al.; "The Value of Purchasing History Data in Target Marketing"; Marketing Science, Apr. 1996, vol. 15, No. 4, pp. 321-340.
Schmittlein et al., "Customer Base Analysis: An Industrial Purchase Process Application", Marketing Science, vol. 13, No. 1, Winter 1994, pp. 41-67.
Smith, Richard M., "The Web Bug FAQ", Nov. 11, 1999, Version 1.0, pp. 4.
"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=1.
"SRC Delivers Industry's First Drive Time Engine Developed to Follow Actual Road Networks," thomasnet.com, May 21, 2006, 4 pages, http://news.thomasnet.com/companystory/485722.
Stein, Benchmarking Default Prediction Models: Pitfalls and Remedies in Model Validation, Moody's KMV, Revised Jun. 13, 2002, Technical Report #020305; New York.
Sweat, Jeff; "Know Your Customers," Information Week, Nov. 30, 1998, pp. 20.
Tao, Lixin, "Shifting Paradigms with the Application Service Provider Model"; Concordia University, IEEE, Oct. 2001, Canada.
TARGUSinfo: Lead Verification, Verify Your Leads With Unique Accuracy and Ease, downloaded from www.targusinfo.com/solutions/verify/Default.asp, as printed Aug. 1, 2006.
TARGUSinfo: Solutions: Services: Verify Express—Verify, Correct and Enhance Customer Provided Data, downloaded from http://web.archive.org/web/20051028122545/http://www.targusinfo.com/solutions/services/verify/, Oct. 28, 2005, as printed Apr. 30, 2011, 27 pgs.
Thoemmes, Felix, "Propensity Score Matching in SPSS", Center for Educational Science and Psychology, University of Tübingen, Jan. 2012.
UPI, "Nielsen Media Research goes electronic," Jun. 14, 2006, 1 page.
"VOD Integration Now Available In Strata: Buyers / Sellers Benefit from VOD Component on Popular Platform," stratag.com, Feb. 21, 2006, 1 page, http://www.stratag.com/news/mediapress022106.html.
Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.
White, Ron, "How Computers Work", Millennium Edition, Que Corporation, Indianapolis, IN, Sep. 1999. [Uploaded in 2 parts].
Whitney, Daisy; Atlas Positioning to Shoulder VOD Ads; Campaign Management Tools Optimize Inventory, TelevisionWeek, May 23, 2005, 3 pages.
Wyner, "Customer valuation: Linking behavior and economics", Aug. 1996, Marketing Research: A Magazine of Management & Applications vol. 8, No. 2 pp. 36-38.
Yoon, Chang Woo; "Vicarious Certification and Billing Agent for Web Information Service", High Spped Network Access Section, Electronics and Telecommunications Research Institute, Jan. 21-23, 1998, pp. 344-349.
Zen et al., "Value-Added Internet: a Pragmatic TINA-Based Path to the Internet and PSTN Integration", Global Convergence of Telecommunications and Distribute Object Computing, Nov. 17-20, 1997, pp. 10.
Declaration of Paul Clark, DSc. for *Inter Partes* Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al. v. Experian Marketing Solutions. Inc*., No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited* v. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* v. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* v. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc., v. Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
Official Communication in Canadian Patent Application No. 2,381,349, dated May 17, 2013.
Official Communication in Canadian Patent Application No. 2,381,349, dated Jul. 31, 2014.
International Preliminary Examination Report in International Application No. PCT/US00/21453 dated Jun. 26, 2001.
International Search Report and Written Opinion for Application No. PCT/US2007/021815, dated Sep. 5, 2008.
International Search Report and Written Opinion for Application No. PCT/US2008/064594, dated Oct. 30, 2008.
International Preliminary Report and Written Opinion in PCT/US2008/064594, dated Dec. 10, 2009.
International Search Report and Written Opinion in PCT/US08/083939, dated Jan. 29, 2009.
International Search Report and Written Opinion for Application No. PCT/US09/60393, dated Dec. 23, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.
International Search Report and Written Opinion for Application No. PCT/US2013/052342, dated Nov. 21, 2013.
International Preliminary Report on Patentability for Application No. PCT/US2013/052342, dated Feb. 5, 2015.

\* cited by examiner

ACCESS CONTROL SYSTEM FOR IMPLEMENTING ACCESS RESTRICTIONS OF REGULATED DATABASE RECORDS WHILE IDENTIFYING AND PROVIDING INDICATORS OF REGULATED DATABASE RECORDS MATCHING VALIDATION CRITERIA

CROSS-REFERENCE TO RELATED APPLICATIONS

This application is a continuation of U.S. application Ser. No. 15/253,743, filed on Aug. 31, 2016, which claims the benefit of priority under 35 U.S.C. § 119(e) of U.S. Provisional Application No. 62/259,039 filed Nov. 23, 2015, the disclosures of which are hereby incorporated by reference in their entirety.

BACKGROUND

With increasing access to electronic data online, allocating and enforcing access restrictions to regulated data presents significant technical challenges.

SUMMARY

Discussed herein are various systems and methods of implementing access restrictions of regulated database records while identifying and providing indicators of regulated database records matching validation criteria. For example, in some embodiments such a system may include a pre-validation system and a targeting system that are in data communication and share certain information to maintain privacy restrictions on user information while providing the most appropriate information to the users. In some embodiments, the pre-validation system comprises one or more hardware computer processors and one or more storage devices configured to store software instructions executable by the one or more hardware computer processors. The software instructions may cause the pre-validation system to receive pre-validation criteria indicating attributes of users that qualify them for a content item from a provider (e.g., an offer provider), access a regulated database of regulated user records including, for each of a plurality of users, a regulated user ID and a plurality of regulated user attributes, wherein access to the user records is regulated by third-party regulations, and receive a targeting database comprising a plurality of targeting records associated with respective users, each targeting record including a user ID and associated personal user information. In some embodiments, for each of the user IDs of the targeting database, the pre-validation system: correlates the user ID with a regulated user record of the regulated database based at least on one or more matches of the personal user information and corresponding of the plurality of regulated user attributes, determines whether the plurality of regulated user attributes match the criteria of the content factors, and identifies the user ID as a pre-validated user ID if the criteria of the content factors are matched. In some embodiments, the pre-validation system generates a pre-validated user ID list including each of the pre-validated user IDs, wherein the pre-validated user ID list does not include any regulated user attributes from the regulated database and transmits the pre-validated user ID list to a targeting system.

In some embodiments, the targeting system comprises one or more hardware computer processors and one or more storage devices configured to store software instructions executable by the one or more hardware computer processors to cause the targeting system to receive the pre-validated user ID list from the pre-validation system, receive, from a digital display entity (e.g., on online digital display entity), a digital entity database comprising a plurality of digital user records associated with respective users of an online service provided by the online digital display entity, each of the digital user records including a digital ID and personal information of the associated user, and for each of the digital IDs in the digital entity database, search the targeting database for personal user information matching personal information of the corresponding digital user record. In some embodiments, if matching personal information is identified in the targeting database, the targeting entity adds the digital ID to a digital ID list, or if matching personal information is not identified in the targeting database, the targeting entity does not add the digital ID to a digital ID list, which is then transmitted to the online digital display entity, wherein the digital ID list identifies users having regulated user attributes in the regulated database matching the content factors.

In some embodiments, the regulated database further includes one or more non-regulated attributes that are not subject to the third-party regulations. In some embodiments, correlating user IDs including determining a confidence level indicating a degree of correlation between personal user information and the plurality of regulated user attributes and identifying the user ID as a pre-validated user ID only if the confidence level meets a minimum threshold confidence level.

In some embodiments, determining whether the plurality of regulated user attributes match the criteria of the content factors comprises receive a weighting for each criteria; weighting each determination of content factors based on the weightings; determine an overall score based on the weighted determination of content factors; and determine if the overall score meets a certain threshold. In some embodiments, criteria of the content factors comprise a minimum or maximum value associated with at least one of: a credit score, bankruptcy data, debt, types of credit, length of credit use, late payments, lines of new credit opened, or total debt. In some embodiments, the personal user information comprises at least one of: name, address, phone number, or email.

In some embodiments, transmitting the digital ID list to the online digital display entity comprises transmitting the digital IDs without transmitting the corresponding user IDs from the targeting database. In some embodiments, the digital targeting system periodically provides at least portions of the targeting database to the pre-validation system. In some embodiments, the stored software instructions further cause the pre-validation system to: receive from a user device user authentication information; if the user is authenticated, deploy a firm offer on a product; and if the user is not authenticated, deploy a general offer. In some embodiments, the regulated user records are FCRA regulated credit data from one or more credit bureaus. In some embodiments, the criteria of the content factors are criteria for providing a credit offer, and the offer provider is a credit issuer.

Figure 1:
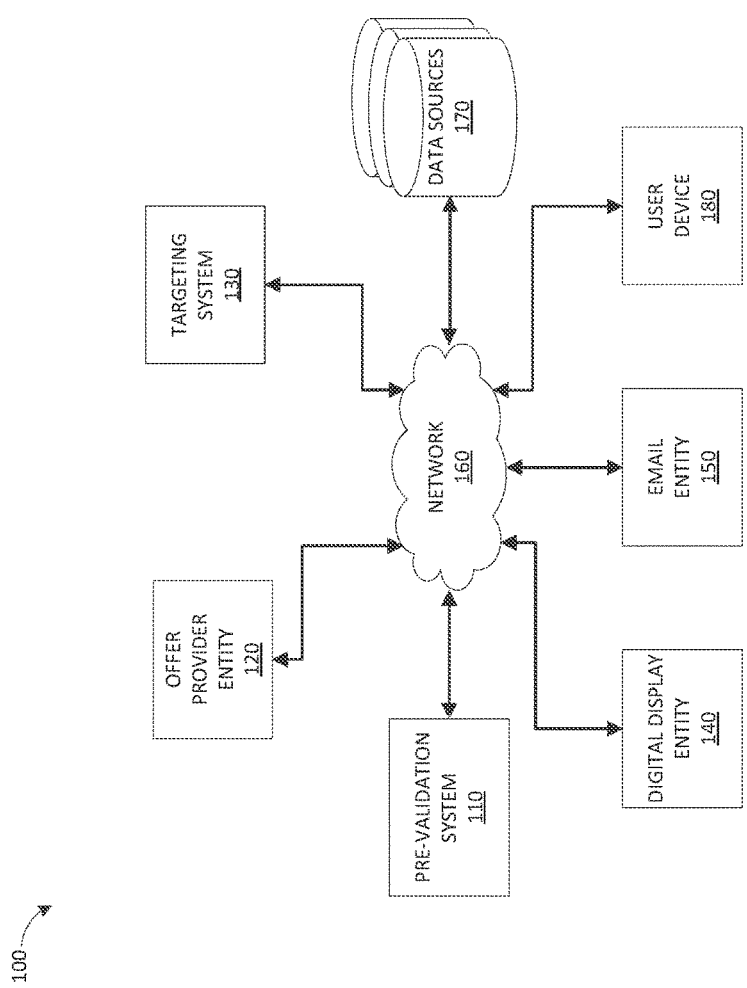
FIG. 1 is a block diagram illustrating one embodiment of a digital targeting system.

These and other features will now be described with reference to the drawings summarized above. The drawings and the associated descriptions are provided to illustrate certain embodiments and not to limit the scope of the invention. Throughout the drawings, reference numbers may be re-used to indicate correspondence between referenced elements. Note that the relative dimensions of the following figures may not be drawn to scale.

DETAILED DESCRIPTION

Various embodiments of systems, methods, processes, and data structures will now be described with reference to the drawings. Variations to the systems, methods, processes, and data structures which represent other embodiments will also be described. Although several embodiments, examples and illustrations are disclosed below, the inventions described herein extend beyond the specifically disclosed embodiments, examples and illustrations and includes other uses of the inventions and modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, various embodiments can comprise several novel features and no single feature is solely responsible for its desirable attributes or is essential to practicing the inventions herein described.

Currently, there are several methods of processing user information in order to determine risk of lending to the user. For example, a pre-screening process may occur in real-time without the user necessarily knowing that their credit is being accessed (without authorizing access to the user's credit data from one or more credit bureaus), while a pre-qualification process may be performed in response to a user request for information regarding qualification for one or more credit products (and authorizing access to the user's credit data from one or more credit bureaus). Such pre-screening and pre-qualification processes are generally referred to herein as pre-validation processes or prescreening processes. For instance, an entity may request pre-validation of a specific user for one or more credit products. A credit file for the specific user may be pulled, the credit data assessed based on pre-approval criteria (or factors) and the requesting entity notified if the specific user met the pre-approval criteria. Such pre-validation processes work well for providing offers (e.g., credit card offers) to known individuals. However, in the online world there are many opportunities to provide offers to online users, such as users that are accessing a social media site, that may not be uniquely identifiable (e.g., to the user level) through browsing data, and thus targeted offer opportunities to those users are lost.

As discussed further below, a pre-validation entity provides a digital display entity the ability to offer products and services to users of an online service (e.g., a social media site) by screening users for eligibility for particular products or services of the offer provider based on regulated data (e.g., credit data that is regulated by the FCRA) that is accessible to the pre-validation entity, but not accessible to the digital display entity. Once users that meet the pre-validation requirements of the offer provider are identified, the pre-validation entity (and/or another entity) may provide indications of the pre-validated users to the digital display entity so that the offer for the goods or services can be provided to the prescreened users. One example of an offer may be via showing an ad for the offer targeted to the qualified individual, so that the user can select the ad and be redirected to the offer provider site, for example, where the actual offer may be displayed. Another example may be via display of an ad for the offer or the offer itself via the online service, such as when the user accesses the online service. In other embodiments, an advertisement for the offer and/or the offer itself may be provide to the user via other means, such as any the digital display channels discussed below. Thus, while certain examples herein may discuss particular digital display entities that provide an offer or an advertisement for an offer, any other digital display entity and/or channel may be used alternatively.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

A pre-validation entity (also referred to herein as a "prescreen entity", a "pre-validation computing system", or a "pre-validation system") is generally an entity and associated computing systems that maintain and/or have access to regulated user data that is usable to identify users that qualify for a particular product or service. The pre-validation entity manages a pre-validation system that receives pre-validation criteria indicating user attributes that qualify users for an offer for a product or service from the offer provider.

Depending on the embodiment, the regulated user data may include credit data regulated by the Fair Credit Reporting Act (FCRA), which restricts sharing of the credit data from the pre-validation entity. Thus, in some embodiments the pre-validation entity is a credit bureau, a business unit of a credit bureau that maintains the credit data and enforces the FCRA access regulations, and/or another entity that is authorized to access the credit data. In other embodiments, the regulated user data may include other types of data, such as healthcare data regulated by the Health Insurance Portability and Accountability Act (HIPAA) or other data that is subject to external regulations (such as set by a government agency) that restrict access to user data that is useful in screening users for certain goods or services. In the examples discussed herein, the pre-validation entity is configured to limit dissemination of any regulated and/or non-regulated user data, such as to reduce the risk that the regulated user data is used in a manner that may not meet the relevant regulations. For example, credit data (regulated user data) is subject to access restrictions of the FCRA that restrict use of user credit data in a different manner than regulations and/or sharing restrictions that may be imposed on marketing data of a targeting entity. Thus, even if the targeting entity is authorized to use the regulated user data, the pre-validation system may limit regulated user data provided to the targeting entity to reduce risks associate with data loss (whether intentional or fraudulent) at the targeting entity (which may not have the same level of data protection as the pre-validation entity). Depending on the embodiment, pre-validation processes discussed herein may include one or more prescreen and/or pre-qualification processes.

An offer provider (also referred to as an "offer provider entity", "offer computing system", or "offer system") is generally an organization that offers goods or services to users (e.g., consumers), such as goods or services that introduce some risk of loss to the offer provider if the user fails to comply with terms of the agreement between the offer provider and the user. For example, the offer provider may be a credit card issuer that offers and issues credit cards to individuals. Prior to offering such financial services to users, the credit card issuer typically analyzes (or receives information from another entity regarding) financial information of the user to determine risk associated with offering a credit card to the user. For example, a risk score, such as a credit score, may be used as an indicator of risk that the user defaults on the credit card. In other embodiments, the offer provider may be an insurance provider, a mortgage broker, a product or service supplier/manufacturer/distributer, an intermediary for services and products, a marketing or public relations firm, or any other entity that offers products or services. In some embodiments, the offer provider identifies pre-validation criteria that must be met for the offer provider to approve providing product or service offers to users. For example, a credit card issuer offer provider may determine pre-validation criteria indicating a minimum credit score (e.g., above 700) that is required for the credit card issuer to offer a particular credit card to a user.

A targeting entity (also referred to herein as a "targeting computing system" or "targeting system") is generally an entity that provides linkage to advertising platforms for targeted advertising. An example of a targeting entity is Experian Marketing Services which maintains a targeting system, a targeting database, as well as a linkage platform. A targeting system may be a platform that links multiple datasets together, and may or may not use Personally Identifiable Information ("PII") to link the datasets. The targeting system may maintain linking keys to various digital display entities, which may include subscriber databases for various services, such as email, advertising, online services, TV, etc. cookies to connect to digital display channels that do not maintain subscribers or members, or any entity that may have access to digital identifiers that identify a user.

An example of a targeting system is Experian Marketing Services OmniActivation Audience Engine, a platform that maintains linked IDs to connect targeted audiences to digital identifiers of various digital display entities. A targeting entity may also have a linkage platform which connects disparate information about a user into consistent profiles. An example would be Experian Marketing Services OmniView. A targeting entity may also maintain a targeting database storing targeting records associated with a plurality of users. For example, a targeting database may store various types of information regarding individuals, such as name, address, contact information, month and year of birth, primary decisions maker, marital status, ethnicity, occupation, other demographic information, and/or any other attributes of users. A targeting database may store data regarding groups of individuals, such as households or businesses. For example, household information may indicate presence of children, length of residence, dwelling unit size, owner/rent status, home value, estimated household income, mortgage amount/date, other demographic information associated with the household, and/or any other attributes of groups of users. One example of a targeting database is Experian's ConsumerView database, which includes data on more than 200 million consumers and 100 million households, such as the user and household attributes noted above, that are usable in determining targeted marketing strategies, such as identifying targeted offers for particular users and/or households. The targeting database generally includes targeting profiles, including unique targeting IDs, for each of a plurality of users.

A digital display entity (also referred to herein as a "digital display computing system" or "digital display system") is generally an entity that provides online content to users via one or more digital display channels, such as any entity that maintains a database of users (whether hundreds, millions, or more users) and some contact information and/or identification information that would allow provision of content to those users. For example, digital display entities include a social media company (such as Facebook, Twitter, Instagram, Pinterest, etc.), a search engine or advertising platform (such as Google, Yahoo, Bing, etc.), a merchant (such as Gap, Banana Republic, Old Navy, etc.), a software application provider (e.g., Microsoft, Google, Steam, etc.), a device provider (e.g., Apple, Samsung, Google, etc.), addressable television or video providers (e.g., Hulu, Netflix, Chromecast, Amazon, Verizon, DirectTV, etc.) a content provider (e.g., Pandora, Spotify, etc.), a credit provider (e.g. Experian, TransUnion, Equifax), or any other entity that maintains user accounts that allow the digital display entity to identify the user. A digital display entity may also include entities that have access to digital identifiers for the entities listed above.

In some embodiments, the digital display entity maintains a digital entity database storing digital user records associated with users of the online content, products, services, etc. of the digital display entity. Users typically can access such online content, products, services, etc., after an authentication process, such as providing a username and password to the digital display entity. Digital entity databases typically include a digital ID for each of the users, such as an identifier that is usable to access a corresponding digital user record of a user. In some embodiments, digital display entities can provide content to users without the user logging into an account. For example, a digital entity database of a smart phone provider may be used to provide customized content to a particular user based on an association between a smart phone ID (e.g., a MAC address or serial number of the phone) with user information (e.g., that may have been provided when the user purchased the smart phone), via a native messaging application of the smart phone or a standalone application installed on the phone, for example. For example, a social media digital display entity may store digital user records in the form of social media profiles that are associated with social media identifiers, such as a social media username. As discussed further herein, a digital display entity may be enabled to provide offers from offer providers to users of the online content, wherein the online offer is preapproved for provision to users based on regulated user data that is not accessible to the digital display entity.

A user device (also referred to herein as a "user device") generally includes any device of a user, such as an electronic device through which an offer from an offer provider may be displayed (e.g., via software and/or a site of a digital display entity). User devices may include, for example, desktop computer workstation, a smart phone such as an Apple iPhone or an Android phone, a computer laptop, a tablet such as an iPad, Kindle, or Android tablet, a video game console, other handheld computing devices, smart watch, another wearable device, etc. A user device may include the same or similar components to those discussed below with reference to the digital targeting system.

Regulated user data generally includes information regarding users that is stored by an entity (e.g., a pre-validation entity) and is subject to external regulations (such as set by a government agency) that restrict how the user information may be used (e.g., accessed, updated, shared, etc.) outside of the storing entity. Regulated user data generally is useful in validating users to receive offers for certain goods or services, but may include sensitive user data that should be protected to a greater degree than publicly available user information. Thus, in some embodiments, dissemination, sharing, and/or any other access to regulated user data may be controlled closely by the storing entity in order to reduce risks associated with improper use of the regulated data, such as any sharing of regulated user data that violates the relevant regulations. Accordingly, while regulated user data may be optimal for determining certain characteristics or propensities of users, such as determining risks associated with issuing a credit account to users, sharing of regulated user data with offer providers, digital display entities, and/or others that might be involved in related marketing or communications to the user may be limited to include only the minimum required regulated user data or no regulated user data.

In one embodiment, regulated user data is credit data that is regulated by the Fair Credit Reporting Act (FCRA), which restricts use of the credit data, such as by limiting how credit data of users may be shared with marketing entities. Thus, in some embodiments the pre-validation entity is a credit bureau, a business unit of a credit bureau that maintains the credit data and enforces the FCRA access regulations, and/or another entity that is authorized to access the credit data. Accordingly, in such an embodiment, the pre-validation entity may limit the use or sharing of user credit data in order to reduce risk of disclosure or other use of the credit data outside of FCRA regulations, whether intentionally, inadvertently, or fraudulently. Regulated user data may include various regulated user attributes, such as information regarding lines of credit, debt, bankruptcy indicators, judgments, suits, liens, wages, collection items, mortgage loans, other loans, retail accounts, checking/savings/transaction data, late or missed payment data, other credit attributes, and/or derivatives/scores/ratings based on at least the credit information.

Personally identifiable information (also referred to herein as "PII") includes any information regarding a user that alone does not uniquely identify a particular user to third parties. For example, IDs of a user that are used to identify a user within a particular database (e.g., a user ID of the targeting database), but that are not usable by third parties (e.g., entities other than the targeting entity and its partners and affiliates) to uniquely identify the user (e.g., the digital display entity cannot uniquely identify the name of the user based on only the user ID) may not be considered PII. However, in some embodiments even user IDs that would be very difficult to associate with particular users might be considered PII, such as if the IDs are unique to corresponding users. For example, Facebook's digital IDs of users may be considered PII to Facebook and to third parties. Depending on the embodiment, and on the combination of user data that might be provided to a third party, PII may include first and/or last name, middle name, address, email address, social security number, IP address, passport number, vehicle registration plate number, credit card numbers, date of birth, telephone number for home/work/mobile.

Example System Architecture

FIG. 1 is a block diagram illustrating one embodiment of a digital targeting system 100. In this example, the digital targeting system 100 includes a pre-validation system 110 that implements certain systems and methods discussed herein, such as pulling credit files for users, accessing pre-validation criteria, and determining if a user's credit data meets the criteria for any of the products or services of offer providers (e.g., based on the associated pre-validation criteria). In other embodiments, the functionality provided for by the components and modules of the pre-validation system 110 may be combined into fewer components and modules or further separated into additional components and modules. In other embodiments, any of these functions may be performed by other computing systems also controlled by the targeting entity and/or controlled by another entity.

In one embodiment, the pre-validation system 110 is configured to interface with multiple devices and/or data sources. The pre-validation system 110 may be used to implement systems and methods described herein. For example, the pre-validation system 110 may be configured to receive pre-validation criteria from one or more offer provider entities 120 and/or other entities that may provide and/or selecting criteria for screening, filtering, or otherwise selecting users to be provided with a targeted offer. Depending on the embodiment, the pre-validation system 110 may store the pre-validation criteria that is received from an offer provider and/or generate the pre-validation criteria itself (such as based on general indications of criteria provided by the offer provider).

In embodiments where pre-validation criteria are based on credit data—data regulated by the Fair Credit Reporting Act (FCRA) that is maintained by one or more credit bureaus, such as Experian®, TransUnion®, and/or Equifax®, the pre-validation system 110 may access and/or receive credit data directly from one or more credit bureaus and/or from a number of data sources 170, such as agents or resellers of the credit bureaus (which may append non-credit information to credit information) that are also subject to FCRA data use regulations. The pre-validation system 110 may receive user information from a targeting system 130 and/or any other entity that may provide user information to identify a user and match the user with credit data, and/or receive user information from any other source, such as directly from the user. The pre-validation system 110 may generate a list of pre-validated users that have met the pre-validation criteria. The list may include all information about the user or any subset of information, which may include regulated and/or non-regulated user data.

According to FIG. 1, information may be provided to and from the pre-validation system 110 over the network 160 from one or more data sources including, for example, the offer provider entity 120, the data sources 170, the targeting system 130, the digital display entity 140 (or digital partners), and the email entity 150. In addition to the devices that are illustrated in FIG. 1, the network 160 may communicate with other data sources or other computing devices. In addition, the data sources may include one or more internal and/or external data sources.

The various entities illustrated in FIG. 1 may be in direct communication with the pre-validation system 110 or may be in communication with the pre-validation system 110 via the network 160, which may include any combination of networks, such as local area, wide area, Internet, etc., by way of a wired and/or wireless network communication connection. In this example, the pre-validation system 110 is in communication with a network 160 and various systems are also in communication with the network 160. The network 160 allows computing devices to send (i.e. transmit) and receive electronic transmissions.

In some embodiments, the system includes a targeting system 130. The targeting system 130 may comprise a targeting database with targeting records associated with respective users. In one embodiment, the targeting system 130 receive a pre-validated user list from the pre-validation system 110. The targeting system 130 may also receive digital IDs from one or more digital display entities 140. The targeting system 130 may correlate the pre-validated user list with the list of digital IDs. The targeting system 130 may then transmit the correlated digital IDs to digital display entities 140 for use in identifying users of the digital display entity that are pre-validated to receive an offer from the offer provider. In some embodiments, the targeting system 130 may transmit digital IDs with other information associated with the user, such as a subset of user information from the targeting database. For example, the targeting system 130 may transmit the digital IDs, information from the received pre-validated user list, and/or other information received, stored, or accessible about the user. The digital display entities may use various advertising channels (e.g., ads placed directly in online content provided by the digital display entity to the pre-validated users, email sent to pre-validated users, or even physical mail or other messages transmitted to pre-validated users) to deploy the advertisement campaign for the offer provider.

While the discussion herein describes certain functions that are performed by certain components or entities, such discussions are illustrative of entities and components that may perform such functions. For example, discussion herein of any structure (e.g., Central Processing Unit or "CPU", memory, etc.) of the pre-validation system 110, or operations performed by the pre-validation system 110 may be equally applied to the targeting system 130, and vice versa. Furthermore, other entities may also perform all or some of the processes discussed with reference to the modules of the pre-validation system 110 and/or the targeting system 130.

Example Pre-Validation Method

Figure 2:
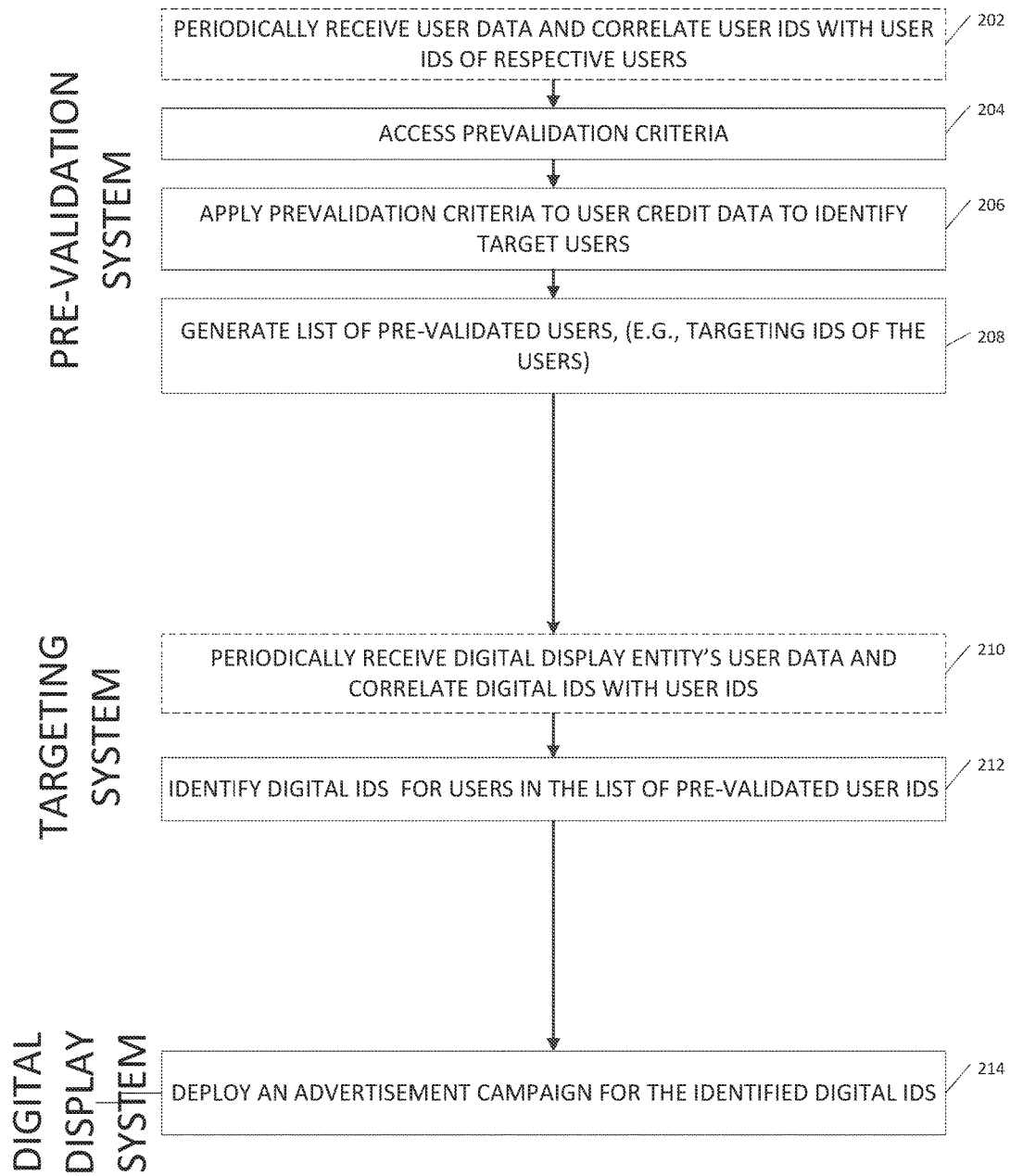
FIG. 2 provides an illustrative flow diagram of a digital targeting system, according to one embodiment.

FIG. 2 is a flowchart illustrating one embodiment of a method of pre-screening users based on credit data pre-validation criteria. In the example of FIG. 2, processes that may be performed by each of a pre-validation system, a targeting system, and/or a digital display entity, are illustrated. However, in other embodiments the processes and functions of the illustrative method may be performed by other entities and/or combinations of entities. For example, in one embodiment the illustrated processes 202-214 may all be performed by a single entity, such as a pre-validation system. Depending on the embodiment, the method of FIG. 2 may include fewer or additional blocks and the blocks may be performed in an order that is different than illustrated.

The illustrative method begins at block 202 with the pre-validation system receiving user data, such as a marketing database that is received from the targeting entity and includes a large quantity (e.g., hundreds of thousands or millions) of user profiles each including user data attributes indicating user personal information, such as name, address, age, gender, interests, etc. Each of the user profiles is associated with a user ID, which may be included with the user data from the targeting entity or may be generated by the pre-validation system. The user data may be received using a push or pull model. The user data regarding a given individual may be gradually received over time, or may be received in a short period of time in a batch process. In other embodiments, the user data may be accessed by the pre-validation system 110 from a user data source 170. In one embodiment, various portions of the user data may be used to match user profiles with credit data of the corresponding users. For example, FCRA regulated credit records may be associated with respective user data profiles accessed from another entity (e.g., another non-FCRA regulated database, such as a marketing database).

In some embodiments, the pre-validation system 110 correlates user profiles with credit data of users based on overlapping information in user profiles (e.g., from a non-FCRA regulated database) and credit profiles (e.g., from an FCRA regulated database). Thus, a user ID associated with a particular user in the user data may be correlated with the particular user's credit data, including a credit ID of the user. For example, personal information (e.g., name, address, etc.), prior credit data, and/or prior correlations may be used for this correlation process. As discussed further below, this correlation is performed in order to allow targeting IDs of users having credit data matching pre-validation criteria to be transmitted to the targeting entity and/or other entities without transmitting any of the original regulated user data, thus limiting dissemination and exposure of that regulated user data to uses that might violate FCRA restrictions. Depending on the embodiment, correlation of user data with credit data may be simplified or skipped if prior correlation was performed. For example, if a clearly accurate correlation was previously performed, then a latter correlation may not be needed, or may only require a reduced quantity of matching attributes in the marketing and credit data.

Continuing to block 204, the pre-validation system 110 accesses pre-validation criteria, which may be received from the offer provider entity 120. The pre-validation system 110 may receive the pre-validation criteria periodically or upon request, such as by using a push or pull model. In other embodiments, the criteria may be generated by the pre-validation system 110. For example, the pre-validation system 110 may generate the criteria based on information the pre-validation system 110 receives from the offer provider, such as the type of services and products they offer, research on users and different credit types, market and economic research, and the like.

At block 206, the pre-validation system 110 applies the pre-validation criteria to user credit data of those users included in the received user profiles (e.g., of the targeting database). For example, the pre-validation system 110 may be configured require each pre-validation criterion to be met by a particular user's credit data (or any other data associated with the user) for that user to be pre-validated for a particular offer associated with those pre-validation criteria. In some embodiments, the offer provider can indicate a subset and/or minimum quantity of pre-validation criteria that must be met in order for a user to be pre-validated (e.g., at least two of six total pre-validation criteria).

In some embodiments, the pre-validation system 110 may use an algorithm to determine how the criteria are applied.

For example, criteria may be weighted (e.g., a credit score criteria may be weighted much higher than an average age of active credit accounts) and the user scored using the weightings in order to determine which are pre-validated. In such an embodiment, a user score may be based on numerical representations of various attributes (e.g., credit attributes) multiplied by the corresponding weighting factor. Depending on the embodiment, other credit and/or non-credit attributes (e.g., marketing attributes of the user from the targeting system) may be used either before and/or after the pre-validation process in order to filter, segment, categorize, and/or otherwise adjust the users on which the prescreening is performed and/or that are included on the pre-validated user list.

In some embodiments, the pre-validation system 110 accesses information regarding previously pre-validated users in conjunction with offer fulfillment information, such as how many of those pre-validated users actually purchased the offered product (or were issued a credit card) or various attributes regarding the value of the credit card account to the credit card issuer (e.g., interest paid, timeliness of monthly payments, maximum balance, utilization, etc.) to adjust pre-validation criteria and/or weightings. Thus, the pre-validation system 110 may use machine learning techniques in some embodiments to optimize pre-validation criteria so that the goals of the offer provider (e.g., profitability attributable to the provision of the offers) are better met.

Moving to block 208, the pre-validation system 110 creates a list of pre-validated users indicating those users matching the pre-validation criteria. In some embodiments, an indicator of pre-validation may be associated with (and/or appended to) the credit data (stored by the pre-validation entity) or the user data (stored by the targeting entity). For example, indicators of whether a user has met pre-validation criteria for each of a plurality of offer providers (or even multiple offers of a single offer provider) may be associated with corresponding regulated user records and/or targeting records, along with the date the pre-validation was performed in some embodiments.

The pre-validation system 110 then transmits (or otherwise makes accessible) the list of pre-validated user IDs (e.g., user IDs from the marketing database that are used by the marketing entity to uniquely identify users) to the targeting system 130. Advantageously, in this example the list of user IDs does not include any of the original FCRA regulated credit data that is subject to the third-party regulations (e.g., the user's credit data from one or more credit bureaus) and can be used by the targeting system to identify users of an online service provided by a digital display entity. In some embodiments, rather than a list of only those pre-validated user IDs, the pre-validation system 110 may transmit a full list of all user IDs with a flag indicating users that are pre-validated and/or not pre-validated, or other indicators of the pre-validated users.

Depending on the embodiment, the pre-validated user ID list may include hundreds, thousands, or more users that have met the offer criteria (e.g., the pre-validation criteria) of thousands or millions of user records in the credit database and/or marketing database.

In some embodiments, the pre-validation process is performed only for a subset of users that are provided by the offer provider, which may include identifiers of particular users or initial criteria that may be used to quickly filter large groups of users from requiring application of the pre-validation criteria (e.g., perform pre-validation only on users with a residence in California).

At block 210, the targeting system 130 receives digital display user data, such as a digital entity database including digital records for each of a plurality of users of one or more online services (e.g., social media sites) of the digital display entity. The targeting system 130 may correlate the digital IDs in the digital entity database with user IDs of corresponding users, such as based on comparison of attributes of users within the digital entity database and targeting database. Correlation of user records within these databases may be performed in the same or similar manner as discussed above with reference to block 202, and in some embodiments confidence levels for each possible match of user records within the databases may be generated, with a minimum confidence level being set by the targeting entity, pre-validation entity, offer provider, and/or digital display entity. In some embodiments, the digital entity database that is provided to the targeting system 130 includes only a subset of digital user attributes maintained by the digital display entity, such as a subset of attributes that are needed to identify matches within the targeting database with at least a predetermined confidence level.

The digital entity database may be received by the targeting entity periodically from the digital display system, such as nightly, weekly, monthly, etc., and/or may be provided on-demand, such as when an updated list of pre-validated users is generated by the targeting system for a new offer (e.g., from an existing offer provider or a new offer provider). In some embodiments, the targeting system 130 generates digital IDs for the digital user records, which may then be provided to the digital display system for future reference to the users.

In some embodiments, the targeting system 130 transmits the user IDs of only the pre-validated users, without any other regulated or non-regulated user data of those pre-validated users. In other embodiments, other indicators of the pre-validated users are transmitted to the digital display entity, such as index numbers of the pre-validated users in the targeting database or the digital entity database. In some embodiments, the targeting system 130 may also transmit at least a subset of regulated or non-regulated user attributes to the digital display entity 140, such as to allow the digital display entity to further customize the offer (e.g., to determine a particular credit card of an issuer that should be offered) or other content provided to the user, or to allow the digital display entity to correlate users in the targeting database with those in the digital entity database.

At block 212, the targeting system 130 identifies digital IDs associated with user IDs in the pre-validated user list, which are, for example, the users of an online service of the digital display system having credit data matching pre-validated criteria of an offer provider. An indication of those digital IDs associated with a pre-validated user may be provided in various forms to the digital display system, such as by append a pre-validation flag to corresponding digital entity records or generating a list of digital IDs (and possibly one or more other user attributes) of pre-validated users. The target entity 130 may then transmit (or otherwise make available) the list of digital IDs to the digital display entity 140, which may then deploy an advertisement campaign to those users identified in the listed digital IDs.

Moving to block 214, the digital display entity 140 provides one or more online services to users and, in particular, to users within the digital display entities database. As a provider of content to users, the digital display entity 140 is operable to provide product and service offers of various offer providers to users of its online service(s), such as in banner ads, pop-up ads, inline ads, etc. For example, a user accessing a social media site of a digital display entity may view advertisements on their mobile device (e.g., smart phone or tablet) or another user device.

Advantages of some of the embodiments include an unconventional method and non-generic system of matching a list of pre-validated users (selected based on credit information of the users) with a list of digital content provider identifiers for digital communication of a firm offer of credit (or advertisement for a firm offer of credit). One advantage is that cookies are not required to include or exclude consumers from audiences with the intent of communicating a firm offer of credit, although cookies might be useful in other aspects. For example, cookies may be used by a digital display entity to identify a user (e.g., via persistent login data stored in a local cookie). In some embodiments discussed herein, certain of these benefits are realized due to higher accuracy of identifying a particular user within a digital entity database, as compared to cookie based targeting. Advantageously, certain embodiments optimize matching of a list of pre-validated users across a diverse set of digital display channels, digital display entities, and digital user identifiers. For example, the systems and methods discussed herein would allow firm offers of credit to be provided directly to mobile devices or addressable televisions of pre-qualified users (e.g., based on identification of the user in the digital entity database of the mobile device or television service provider), which may have limited or no cookie functionality and are not able to uniquely identify the users. Thus, because cookies are typically probabilistic (e.g., don't indicate a particular user with certainty, and typically identify only categories of probable characteristics associate with a user or users of a particular device) and offering of a firm offer of credit requires a deterministic identification of a qualified user, use of cookies in identifying users for prequalified offers of credit are limited. Additionally, cookies may be disabled or made inaccessible by settings on a computing device, such as browser settings that block cookies, one device may have multiple cookies, one user may have different cookies across multiple devices, and other known disadvantages of relying on cookies, thus even further decreasing value of cookies in deterministically identifying a user for a firm offer of credit.

Example Data Flow Diagram

Figure 3:
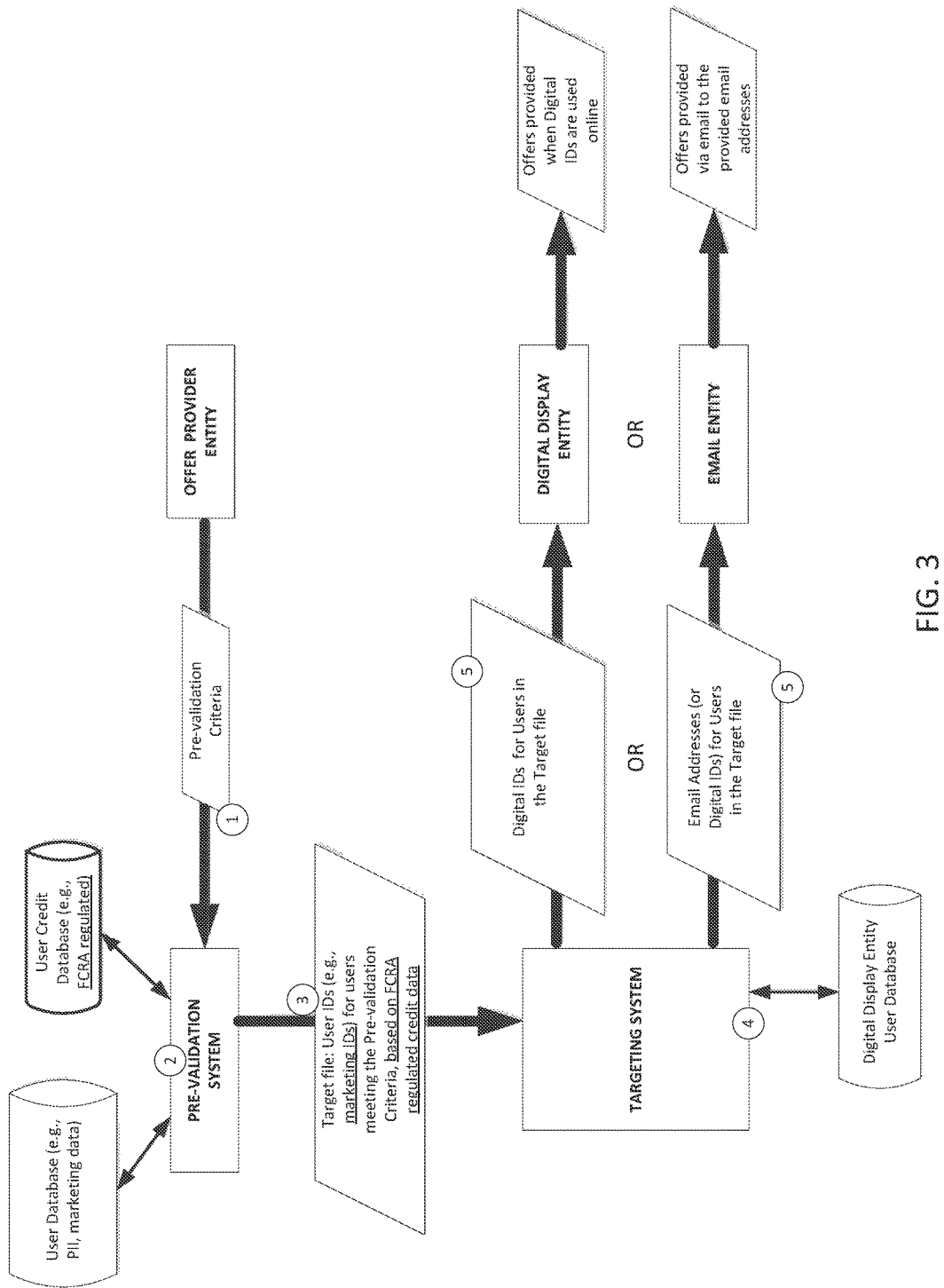
FIG. 3 provides an illustrative data flow example for providing targeted offers for credit to online users using user credit-related information, but without the need to use cookies, according to one embodiment.
Figure 4:
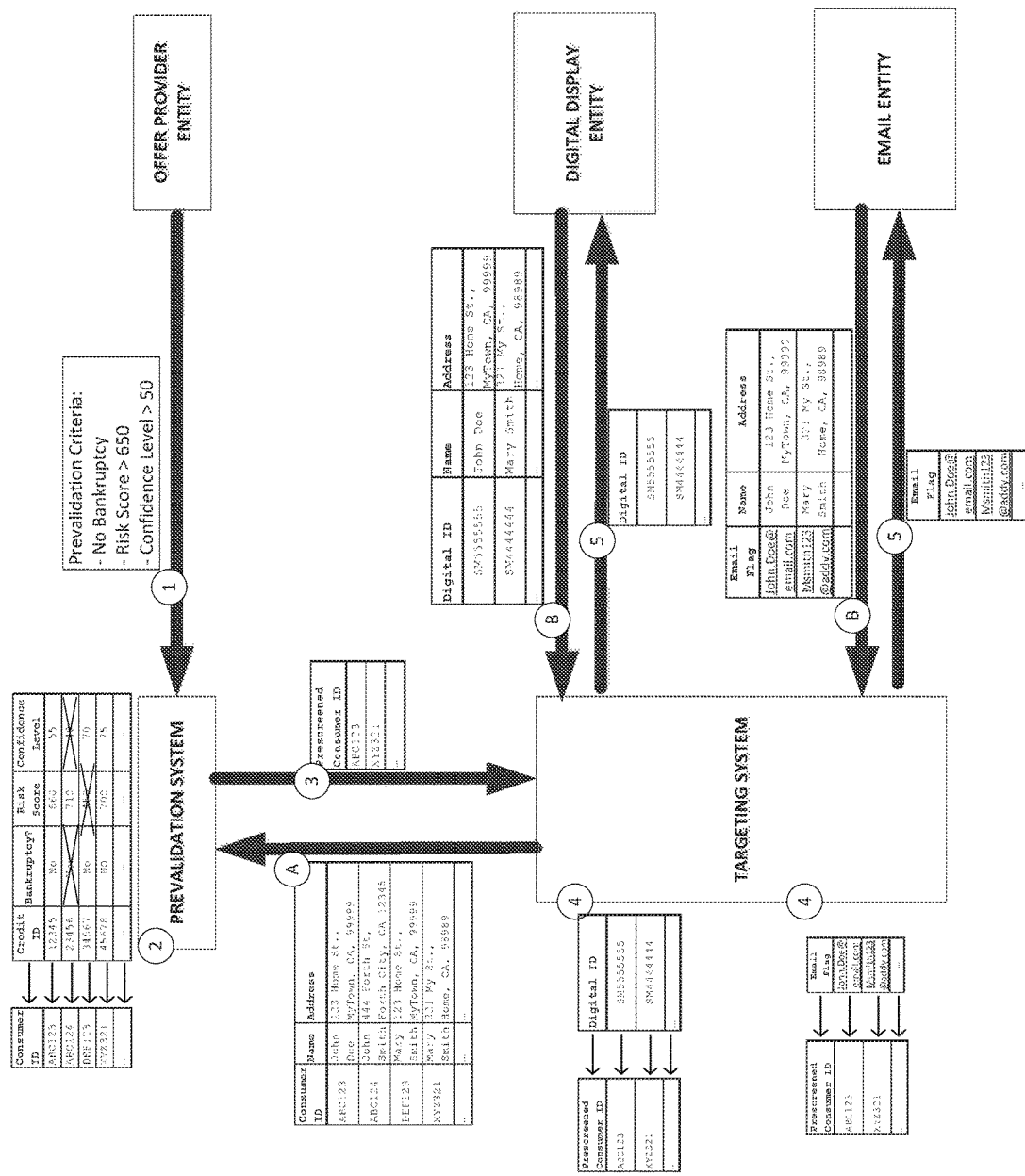
FIG. 4 provides an illustrative data flow example for providing targeted offers of credit to online users that are pre-validated based on their credit information, without sharing any of the user's credit information with a digital provider of the credit offer, according to one embodiment.

FIG. 3 provides an illustrative data flow example for providing targeted offers for credit to online users using user credit-related information, but without the need to use cookies, according to one embodiment. FIG. 4 provides an illustrative data flow example for providing targeted offers for credit to online users using credit-related information, but without the need to use cookies, using examples of data tables that may be transmitted and received between entities, according to one embodiment. Depending on the embodiment, the process illustrated by interactions (1)-(5) and (A) & (B) of FIG. 3 or 4 may include fewer or additional interactions and/or the interactions may be performed in an order different than is illustrated. FIGS. 3 and 4 is also a block diagram which illustrates the exemplary process and data flow between one or more offer provider entities 120, a pre-validation system 110, a targeting system 130, one or more email entities 150, and one or more digital display entities 140, according to one embodiment, such as the system illustrated and described with respect to FIGS. 3 and 4 herein.

At interaction (1) of FIG. 3, one or more offer provider entities 120 may send or submit offer criteria to the pre-validation system 110. This may be initiated by a third party (such as a bank, retailer, website, offer provider, lead aggregator, or the like) that sends a pre-validation request to the pre-validation system 110 (such as a credit bureau and/or other entity having access to user credit data) requesting a pre-approved list of users for products and services. This may also be initiated by a periodic pre-validating service offered by the pre-validation system 110 to third parties, that may initiate such methods periodically. In some embodiments, entities other than offer provider entities 120 may send or submit criteria that will be used to create a pre-validated list of users. The pre-validation system 110 may receive offer criteria from all or select offer provider entities 120 in communication with the pre-validation system 110, so that the pre-validation system 110 may compare the offer criteria with information on the user in order to determine a pre-validation list of users to target. In some embodiments, entities other than the pre-validation system 110 may receive offer criteria for the purposes of generating a pre-validation list of users, or for sending the criteria for the purposes of fulfilling the generation of a pre-validated list of users.

For example, as shown in interaction (1) of FIG. 4, the offer provider entity 120 provides three offer criteria to the pre-validation system 110. The three criteria in this example include criteria that match users that have not had a bankruptcy, have a risk score of over 650, and a confidence level over 50. Any other criteria may be used to prescreen users, such as how much is owed on different types of credit, how long the user has been using the credit, the number of late payments, lines of new credit opened, types of credit used, positive information on the line of credit, own or rent a house and/or car, rent or mortgage payments, total debt, and the like. In one embodiment, such as an embodiment where the offer is a firm offer of credit, the prescreen criteria are limited to application on credit data of the regulated user data. In other embodiments, the pre-validation criteria may consider other user data, such as user data from multiple databases, where regulated or unregulated.

The confidence level in this example indicates a likelihood that the person associated with the user ID (from the targeting database) is the person associated with the credit data (from the credit database). For example, a confidence level of 100 may indicate that the match is certain, while lower confidence levels indicate increasingly lower level of certainty that the appropriate user in the targeting database is linked to the credit data. Other types of confidence levels may be used, such as weighting factors, prioritizing types of information to check, having algorithmic determinations, using prior correlations, and checking the user's history. Different offer providers and/or digital display entities may have varying confidence levels required for including otherwise pre-validated users on a target file of users to which a credit offer is provided.

In some embodiments, the pre-validation system 110 may obtain information from the offer provider entity 120 that describes the ideal user (for receiving an offer from the offer provider). The pre-validation system 110 may then derive the particular offer criteria from that more qualitative information provided by the offer provider entity 120. The offer criteria may be sent upon request, or periodically (for example, once a month, once a week, or once a year). In some embodiments, the pre-validation system 110 may access a data store to obtain the offer criteria. In some embodiments, the pre-validation system 110 may access a data store of this offer criteria and may not need to receive offer criteria from an offer provider entity 120.

In some embodiments, the offer provider 120 may provide direct access of the offer criteria to the pre-validation system 110. For example, the offer provider 120 may employ an application programming interface ("API"), widget, or other user interface, that a pre-validation system can use to obtain this information.

If the offer provider 120 has authorized a particular pre-validation system to access the offer criteria, the offer provider 120 may accept an API call from the pre-validation system 110 and respond to the API call accordingly. As one example, the API may enable the pre-validation system 110 to request specific offer criteria or all offer criteria associated with a particular offer provider, a particular offer, and/or a particular digital advertiser. In this case, the offer provider entity 120 may respond to an appropriate API call received from the pre-validation system by sending offer criteria associated with some services and/or products to the pre-validation system 110 via a responsive API method. In other embodiments, the pre-validation system 110 application or service may provide additional information to the offer provider. For example, a pre-validation system 110 may desire offer criteria for a particular product/service. In some embodiments, the offer criteria may be sent and received by using either a push or pull model.

At interaction (A) of FIG. 4, the targeting system 130 transmits the user information to the pre-validation system 110. The example shows name and address as the personal information transmitted. However, it is appreciated that other types of personal information may also be transmitted. Personal identifiable information and sensitive personal information may be transmitted. Some examples of personal information include: education, email address, phone number, salary, work phone number, job title, work place, professional licenses and degrees, and the like. In other embodiments, this personal information does not have to be transmitted to the pre-validation system 110 and may already be stored in a data store that the pre-validation system 110 has access to. In some embodiments, the pre-validated entity correlates the user ID with the credit information without the need of personal information, and thus, interaction (A) may not be needed. In other embodiments, other entities may send the user personal information to the pre-validation system 110. The user personal information may be sent periodically (for example, once a month, once a week, or once a year) or upon request. The user personal information may be used by the pre-validation system 110 to correlate user IDs with credit data and user personal information. The user information may be transmitted and received in ways described above for interaction (1).

At interaction (2) of FIG. 3, the pre-validation system 110 may access user data and correlate user IDs with credit data of respective users. The pre-validation system 110 may access user personal information data and user credit data from a user data sources 170, such as the user database and the user credit database, and/or pre-validation system 110 may receive this user data from a different entity. The user database may include the user personal information. The pre-validation system 110 may correlate the user IDs with the credit IDs and associated credit data using the personal information. For example, the pre-validation system 110 may correlate the user IDs with the name and address of the user, and the credit data. The pre-validation system 110 may apply the offer criteria to the list of users. For example, at interaction (2) of FIG. 4, the user IDs are correlated with the bankruptcy data and risk scores associated with the users. In this example, the first offer criterion is to select users that have not filed for bankruptcy. User ID ABC124 is correlated with a bankruptcy. The second offer criterion is to select users with a risk score above 650. User ID DEF123 has a risk score of 450. Thus, these two users do not meet the offer criteria and are not included in the pre-validated user ID list. Furthermore, a confidence level may also be checked. This confidence level may be the determination of how likely the person associated with the user ID is in fact the person associated with the credit data. For example, at interaction (2) of FIG. 4, User ID ABC124 has a confidence level that is less than 50 and does not meet the offer criteria. Other ways of correlating the user IDs and the credit information is appreciated. For example, a confidence factor may be determined based on how closely the personal information is matched. In some embodiments, User IDs may be appended to the credit ID list, or vice versa. One advantage of some embodiments may be that a prior correlation of User ID and Credit ID may eliminate the need to correlate the IDs at a later time, or may change the way that the correlation is performed.

The User ID may already be appended to the user information. In other embodiments, the user ID may be generated and appended after correlating the user information with the user credit data. In some embodiments, the user ID may be created only if the user information is correlated with the credit data. In some embodiments, the pre-validation system 110 may use a company's identifier as the user ID and associated user information. For example, Experian's ConsumerView database gives entities the ability to leverage predictive insight to better understand and anticipate evolving user behaviors and channel preferences. As the largest and most comprehensive resource for both list services and data enhancement available today—including data on more than 200 million users and 100 million households—ConsumerView offers core user data assets overlaid with behavioral and retail purchasing data. This combination results in the deepest and most granular insight into users, which may be used when determining a pre-validated user ID list.

At interaction (3) of FIG. 3, the pre-validation system 110 may transmit, send, or submit the pre-validated user ID list to the targeting system 130. In some embodiments, the pre-validation system 110 and the targeting system 130 is a single entity, and thus, interaction (3) is not needed. In other embodiments, the steps performed by the pre-validation system 110 and the targeting system 130 may be performed by other entities. The pre-validated user ID list may be transmitted to other entities. The pre-validated user ID list may be transmitted with other information, such as credit data or personal information. In some embodiments, the pre-validation system 110 may transmit a list of pre-validated user IDs without other information. One advantage of this embodiment is that it would allow for better security from information theft by just sending user IDs without personal or credit information. Furthermore, sending the user IDs may improve throughput by reducing the amount of data sent from one entity to another and reducing the amount of encryption/decryption that has to be done by the entities. Furthermore, the list of pre-validated IDs may be limited to user IDs, rather than including any of the original credit data of the user. Thus, the transmission from the pre-validation system 110 to the targeting system 130 creates less exposure of sensitive information (e.g., credit data of the user) for information breaches.

User information may be stored in a database which can be vulnerable to cyber-attacks for sensitive information. Thus, in some embodiments the targeting system deletes the user ID list after a specific time frame or after particular actions have been taken, such as after transmitting the corresponding digital IDs to one or more digital display entities. The pre-validated user ID list may be transmitted and received in ways described above in interaction (A). For example, at interaction (3) of FIG. 4, the user IDs ABC123 and XYZ321 are sent from the pre-validation system 110 to the targeting system 130.

At interaction (B) of FIG. 4, the digital display entity 140 transmits a digital ID and some user personal information to the targeting system 130. The example shows name and address as the personal information transmitted. However, it is appreciated that other types of personal information may also be transmitted, as described above. In other embodiments, this personal information does not have to be transmitted to the targeting system 130 and may already be stored in a data store that the pre-validation system 110 has access to. In some embodiments, personal information does not have to be transmitted to the targeting system 130 because the targeting system 130 correlates the pre-validated user ID with the digital ID in other ways than using personal information. In other embodiments, other entities may send the user personal information to the targeting system 130. The user personal information may be sent periodically (for example, once a month, once a week, or once a year) or upon request. The user personal information may be used by the targeting system 130 to correlate pre-validated user IDs with the digital IDs. The user information may be transmitted and received in ways described above for interaction (1).

At interaction (4) of FIG. 3, the targeting system 130 may access user personal information data and correlate user IDs with digital IDs of respective users. The targeting system 130 may access user personal information data from a user data store, and/or the targeting system 130 may receive this user data from a different entity. The user database may include the user personal information. For example, the targeting system 130 may correlate the user IDs with the digital IDs using the name and address of the users. The targeting system 130 may send a list of digital IDs without having to send personal, sensitive, confidential, privileged, credit, and/or other important information. For example, at interaction (4) of FIG. 4, the user IDs ABC123 and XYZ321 are correlated with the digital IDs SM5555555 and SM4444444 based on the name and address of the users. However, it is appreciated that the digital IDs may be linked to the pre-validated user IDs using other types of information. It is also appreciated that the correlation performed at interaction (4) may happen periodically with any list of user IDs, or upon a specific circumstance that requests that the correlation be performed on a specific list of user IDs, such as the list of pre-validated user IDs. In some embodiments, the pre-validation system 110 may require that users meet all pre-validation criteria to be added to the pre-validation list. However, it is appreciated that the pre-validation system 110 may select from a subset of criteria, may weigh and/or prioritize the criteria, may request a selection of the certain criteria, and/or the like. In some embodiments, digital IDs may be appended to the pre-validated user ID list, or vice versa. As described in interaction (2) of FIGS. 3 and 4 above, the correlation at interaction (4) as described here may also contain a confidence level to determine the likelihood that the user ID is matched correctly with the digital ID.

At interaction (4) of FIG. 3, the targeting system 130 may correlate user IDs with email flags of respective users. For example, the targeting system 130 may correlate the user IDs with email flags using the name and address of the users. The targeting system 130 may send the email flags to the email entity 150. For example, at interaction (4) of FIG. 4, the user IDs ABC123 and XYZ321 are correlated with email flags John.Doe@email.com and Msmith123@addy.com. Other information may be used to make the correlation, and create a confidence level, as described above. The email flag may include the entire email strand, may simply be a flag indicating the availability of an email, or the like. Upon receipt of the list indicating the users with associated emails, the email entity may then deploy an email advertisement campaign to the user based on the email flag.

At interaction (5) of FIG. 3, the targeting system 130 may transmit, send, or submit the digital ID list to a digital display entity 140 or an email entity 150. In some embodiments, the targeting system 130 may transmit other information that may be used to represent the users on the digital ID list. For example, the targeting system 130 may send email address, name, and/or any other identifier associated with the pre-validated user that may be used by the digital display entity to identify the users. In some embodiments, the targeting system 130 and the digital display entity 140 and/or email entity 150 are a single entity, and thus, interaction (5) is not needed. In other embodiments, the steps performed by the targeting system 130 and the digital display entity 140 or the email entity 150 may be performed by other entities. The pre-validated user ID list may be separated into sub-lists to be sent to various digital display entities 140 and email entities 150. For instance, the digital display entity may only receive a list of digital IDs that could have been matched to the personal information sent in interaction (B). The digital ID list may be transmitted with other information, such as credit data or personal information. In some embodiments, the targeting system 130 may transmit a list of digital IDs without other information. The digital ID list may be transmitted and received in ways described above in interaction (A). For example, at interaction (5) of FIG. 4, the digital IDs SM5555555 and SM4444444 are sent from the targeting system 130 to the digital display entity 140, the digital IDs that met the offer criteria sent by the offer provider entity 120 and with a digital ID. Similar advantages as applied to interaction (3) may apply to interaction (5).

Digital display entities 140 may have their own particular digital IDs for their users. For example, Twitter, Instagram, Vimeo, Skype, YouTube, Facebook, Yahoo, Google, Pinterest, LinkedIn, Flickr, and the like may each have their own set of digital IDs to identify each of their users, such that a particular user may have different digital IDs for each of these digital display entities. The targeting system 130 may correlate the digital IDs for each of the digital display entities 140 to the user IDs. Then, the targeting system 130 may send each digital display entity 140 a list of digital IDs that are associated with their internal digital ID format and that are correlated with pre-validated users that have met the offer criteria. Thus, the pre-validation system 110 and the targeting system 130 can share information with the digital display entities 140 by sharing IDs that are not PII and/or are not easily translated to other sensitive information, such as name, address, email, job position, etc.

The digital display entity 140 may deploy an advertisement campaign for the user associated with the digital ID. For example, the digital display entity 140 may deploy an advertisement when the user's account associated with the digital ID is currently online. The email entity 150 may deploy offers via email to the provided email addresses of the users associated with the pre-validated user ID list. For example, digital display entities 140 such as Yahoo, AOL, Microsoft, Google, Facebook, may serve multiple advertisements all for the same offer provider entity 120. Digital display entities 140 may transfer data using an approved secure method, for example, to be reviewed by an Info Security BISO (business information security officer). The digital display entity 140 may deploy a pre-validated offer or a firm offer of credit to the user. The type of offer presented may be based on the type of authentication that has been performed when identifying the pre-validated user and/or that will be performed after the user selects the advertisement campaign.

Example Flowchart of an Advertisement Campaign

Figure 5:
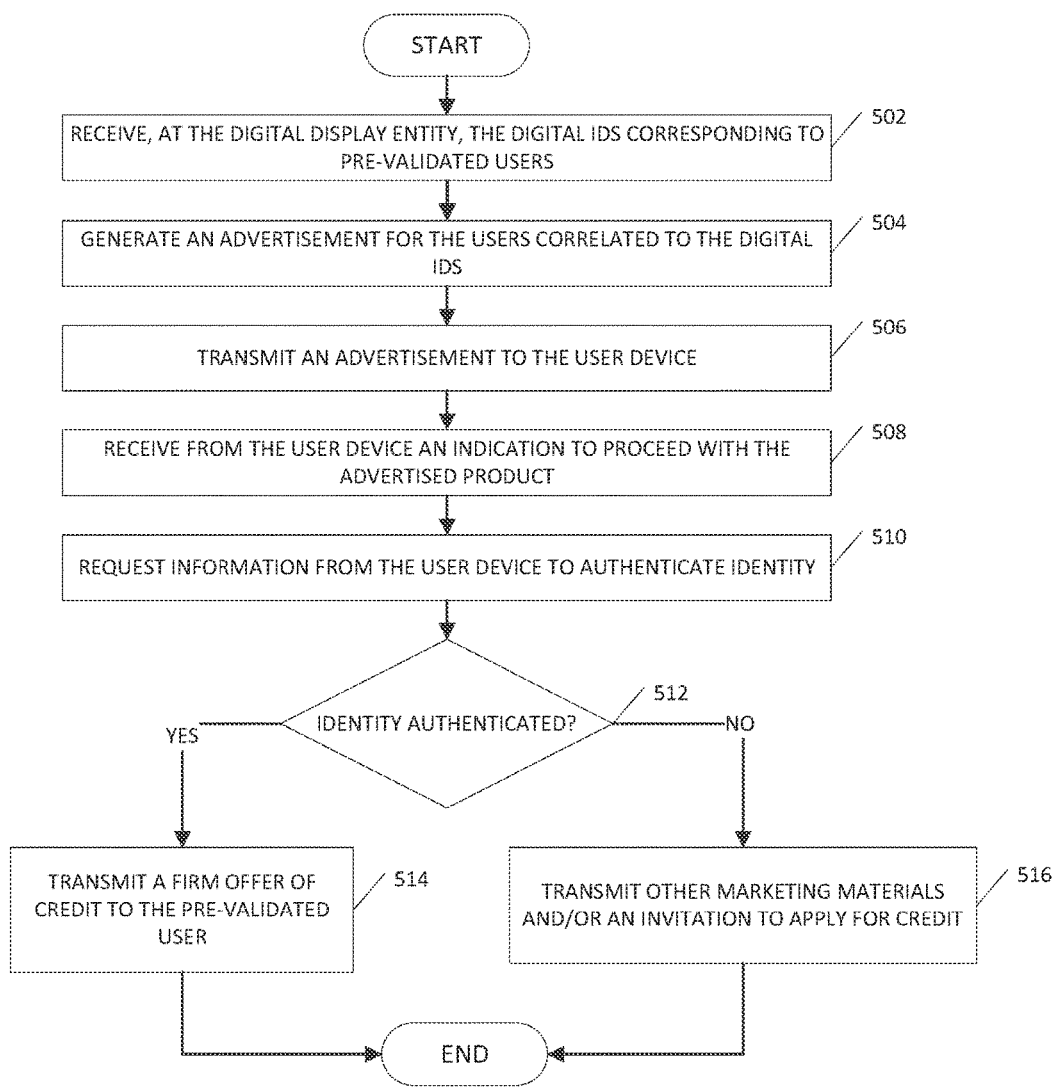
FIG. 5 provides an illustrative flow diagram of an advertisement campaign, according to one embodiment.

FIG. 5 provides an illustrative flow diagram of an advertisement campaign, according to one embodiment. While the illustrative method is described below with respect to a digital display entity 140, it will be appreciated that in other embodiments the illustrative method may be performed by other entities, system, devices or combinations of entities, systems, and/or devices. Depending on the embodiment, the method of FIG. 5 may include fewer or additional blocks and/or the blocks may be performed in an order that is different than illustrated.

The illustrative method begins at block 502 where the digital display entity 140 receives the digital IDs corresponding to pre-validated users for the purposes of targeted advertisement. The digital IDs may be received from the targeting system 130, or other entities that may have a list of pre-validated digital IDs. The digital IDs may be provided in any manner available, such as via a shared server, folder, website, etc., digital transmission to the digital display entity, or any other means. The received data may include the digital IDs and may or may not include other data, such as personal IDs, credit IDs and credit data, user information, the type of service or product offered, and the like. The targeting system 130 may send the digital IDs at certain circumstances, such as when it is known that the users are online. Alternatively, the digital display entities may receive the digital IDs and use them to provide the indicated advertisement or offer when the users are accessible to the digital display entity. For example, a digital display entity my monitor access of an online service with reference to a list of pre-validated digital IDs to determine when the users are online and deliver the advertisement or offer to them via the online service.

At block 504, the digital display entity 140 may generate an advertisement for the users correlated to the digital IDs. The digital display entity 140 may request content of the advertisement from the offer provider entity 120 and/or from the pre-validation system. The digital display entity 140 may create the advertisement for the pre-validated users. The digital display entity 140 may create an advertisement based on the type of user device 180 the user is associated with. For example, if the user is associated with a user device 180 correlating to a mobile device, then the digital display entity 140 may generate an advertisement that is linked to a certain application on the user device 180. For example, the digital display entity may identify users that are more prone to look for mortgage loans and may deploy a loan advertisement when the user is checking their internet banking application. In another example, the digital display entity 140 may identify the user's device 180 as a specific mobile device and may deploy an advertisement particular to the device itself and/or on a mobile device platform. For instance, the digital display entity 140 may identify the user device 180 as a mobile device under a certain carrier, identify the model and the operation system to generate the appropriate advertisement, the phone number to send an instant message advertisement, identify the model of the phone to determine capacity and processing speed to generate a more or less detailed advertisement, the Bluetooth or Wi-Fi address, and/or the like. In another embodiment, the digital display entity 140 may deploy an advertisement if the user device 180 is associated with a digital wallet. The advertisement may be deployed onto a digital wallet interface. In some embodiments, the digital IDs received from the targeting system include IDs particular to other communication channels, such those discussed above (e.g., mobile device ID).

The digital display entity 140 may use other information to determine when, how, and who to send offers. For example, if the digital display entity 140 has access to the user's location, then the digital display entity 140 may present an offer for a product if the user is 30 feet (or some other predetermined distance) away from a store that sells the offer provider's products. For example, for users with a good credit score and high salary, the user may be notified of a discount sale at a sports car store nearby.

At block 506, the digital display entity 140 may transmit the advertisement to the user device 180. In other embodiments, the digital display entity 140 may enable the advertisement on the user device 180 and may not have to send the actual advertisement, or may use a third party to create and send the actual advertisement. The advertisement may be a pre-validation offer where more authentication is requested or may be a firm offer of credit. The display may show an advertisement or the actual offer.

At block 508, the digital display entity 140 receives from the user device 180 an indication to proceed with the advertised product or service. This may be as a result of the user device 180 clicking on a portion of the user interface, or inputting some other command to indicate that the user wants to proceed with the product or service. Then at block 510, the digital display entity 140 requests further information to confirm via the user device 180 to authenticate their identity. The authentication may include a user inputting information to verify the identity of the user (e.g., one or more of a name, address, answer to secret questions, out-of-wallet security questions, etc.). For example, the authentication determines with a certain confidence level that the person communicating with the digital display entity is the same person that was pre-validated for the offer. Thus, in some embodiments the authentication may include verification of whether the user is included in the list of pre-validated users, such as through an electronic communication to the pre-validation system and/or the targeting system. In some embodiments, other and/or additional criteria may be received, accessed, and/or analyzed in order to authenticate the user of the user device.

In block 512, the digital display entity 140 determine whether the identity of the user of the user device has been authenticated (as the pre-validated user). For example, if the husband of a pre-validated user was is accessing the digital display system, the authentication should fail since the pre-validated user is actually the wife. Thus, this authentication, which may be as simple as requesting the name and address of the user, may reduce delivery of offers to unintended recipients. If the identity is authenticated, then the process will continue to block 514. If the identity is not authenticated, then the process will continue to block 516. Depending on the offer being provided, the authentication (e.g., blocks 508, 510, and 512) may not be needed and the process may continue to block 514 or 516 where an offer or other marketing material is provided to the user.

If the identity is authenticated, then at block 514, the digital display entity 140 provides an advertisement that includes a link to and/or an actual firm offer of credit (or other offer indicated by the offer provider) to the user device 180 via the digital display channel. If the identity is not authenticated, the digital display entity 140 may transmit other marketing materials and/or an invitation to apply for credit (or other offer) at block 516. For example, the user may be offered a generic offer for the product or service. The user may be asked if he or she would like to view other products or services For certain offers, such as firm offers of credit, where authentication failed, in some embodiments the user may be redirected to a site, application, or other user interface (e.g., of the offer provider) where they may be screened for the offer themselves and have the opportunity to receive the same or similar offer if approved. For example, user that wish to apply for credit may consent to the pull of credit information, which may then be compared to offer criteria (which may be the same as the pre-validation criteria), and be provided with a firm offer of credit if the criteria are met.

Depending on the embodiment, the offer that is provided to the user via the digital display entity may be an advertisement for the offer and/or the actual offer. The offer (or ad for the offer) may be generated by the digital display entity 140 or may be received from the offer provider 120 or the pre-validation system 110. In some embodiments, the offer provider 120 may provide an advertisement and/or offer to the targeting system 130 and/or the pre-validation system 110, which may then provide the advertisement and/or offer to the digital display entity 140.

In some embodiments, the digital display entity 140 may request the offer (or ad for the offer) from another entity at the time the offer is displayed to the user via the digital display channel. For example, a frame (or other placeholder) may be included in content of the digital display entity that causes the user device to request the offer content from the offer provider 120, the targeting system 130, and/or the pre-validation system 110. In such an embodiment, the digital display entity may not have any access or insight into the actual offer or ad that was provided to its user. In some embodiments, a similar request for content may be transmitted by the user device to the targeting system (when code from the digital display entity is executed), but with the request including an identifier of the user (e.g., the digital ID) so that the targeting entity can check for the user on the pre-validated user list and provide the appropriate offer (or ad for an offer) if the user has been pre-validated, while providing some other content if the user isn't on the pre-validated list. This might further remove the digital display entity from access to the pre-validation identifiers since the digital display entity may not need to receive any list of users or identifiers, and thereby further improving security of sensitive and/or regulated user information.

Example Method of Authenticating the User

Figure 6:
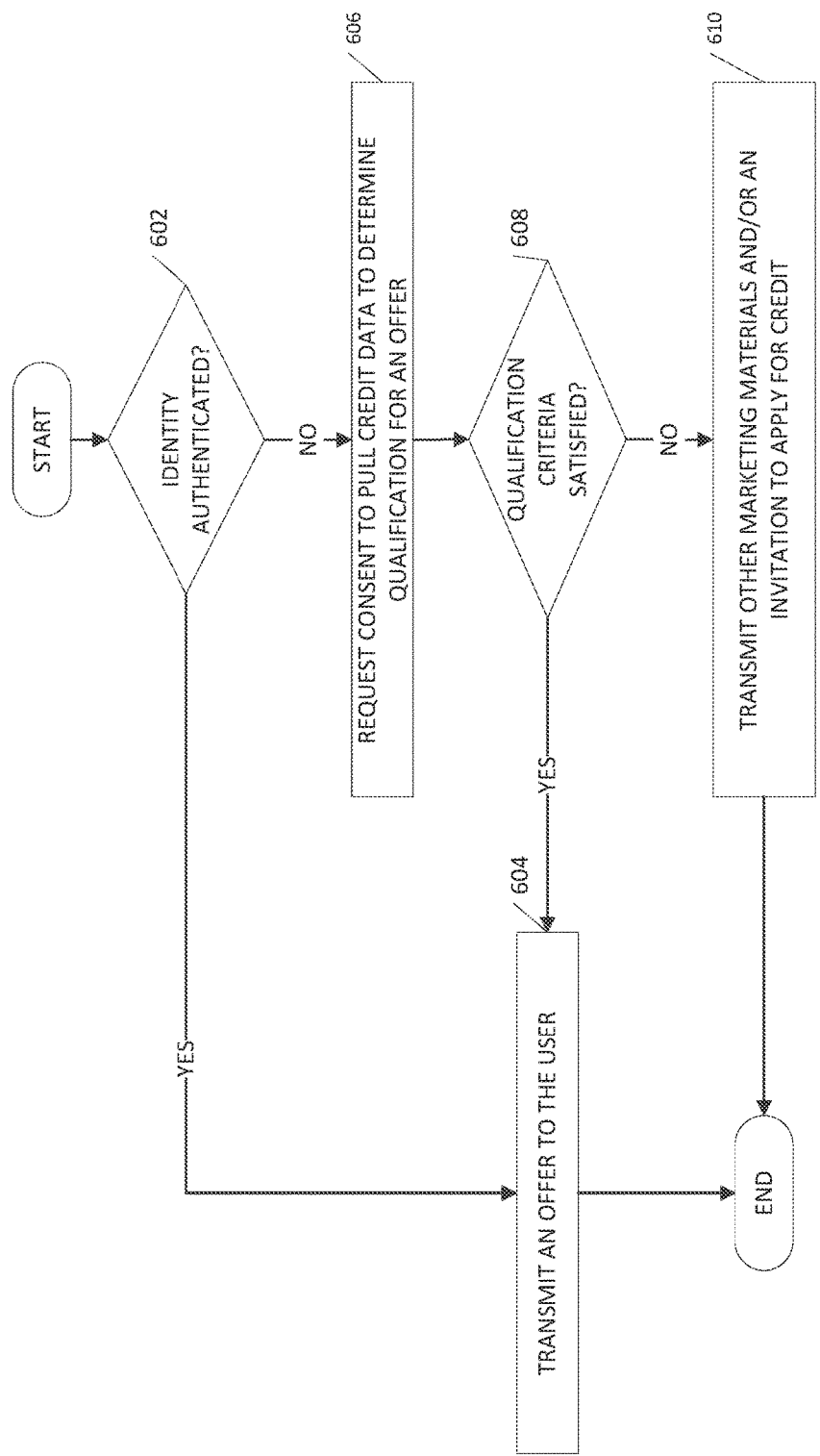
FIG. 6 is a block diagram showing example components of a pre-validation system, according to an embodiment.

FIG. 6 provides an illustrative flow diagram of an offer qualification process that may be performed if the user in communication with the digital display entity is not authenticated. While the illustrative method is described below with respect to a digital display entity 140, it will be appreciated that in other embodiments the blocks of the illustrative method may be performed by other entities. Depending on the embodiment, the method of FIG. 6 may include fewer or additional blocks and the blocks may be performed in an order that is different than illustrated.

Beginning it block 602, the digital display entity 140 determines whether the user of the user device has been authenticated, such as via any of the one or more authentication procedures discussed above with reference to blocks 508-512 of FIG. 5. As discussed above, the authentication procedures may be performed by various entities, such as the offer provider, the pre-validation entity, the targeting entity, and/or a third-party authentication service. If the user is authenticated at block 602, an offer (e.g., a firm offer of credit or advertisement that leads to a firm offer of credit) may be transmitted to the pre-validated user at block 604 via the digital display channel.

At block 602, if the user is not authenticated, the user may be requested to provide consent to pull his or her credit data so that an independent qualification process (e.g., based on the same or similar criteria as the pre-validation criteria) may be performed on the user. At block 608, if the user's credit data matches the qualification criteria, then the user is provided with the same offer (or ad for an offer) that is provided to pre-validated users at block 604. Otherwise, If the user's credit data does not match the qualification criteria, then the user may receive other marketing materials and/or an invitation to apply for one or more lines of credit.

Example System Implementation and Architecture

Figure 7:
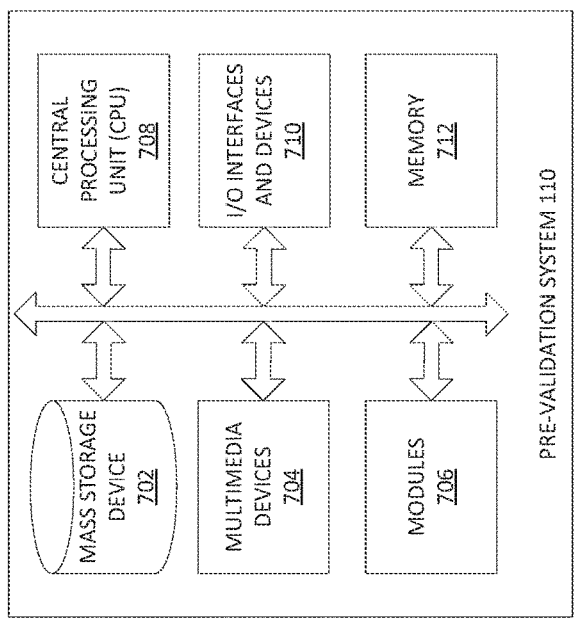
FIG. 7 is a block diagram showing example components of a pre-validation system, according to an embodiment, which represents example components and functions of any of the systems, devices, and/or entities discussed herein.

FIG. 7 is a block diagram showing example components of a pre-validation system 110, according to an embodiment, which represents example components and functions of any of the systems, devices, and/or entities discussed herein. The various software used to execute the functions discussed herein, which may be referred to as "modules" 706, may be located on the pre-validation system 110 and/or server device depending on the implementation. These and other modules in the pre-validation system 110 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Other devices discussed herein may include any combination of the components, modules, functionality, etc., discussed below with reference to FIG. 7.

The pre-validation system 110 includes, for example, a personal computer that is IBM, Macintosh, or Linux/Unix compatible or a server or workstation. In one embodiment, the pre-validation system 110 comprises a server, a laptop computer, a smart phone, a personal digital assistant, a kiosk, or a media player, for example. In one embodiment, the exemplary pre-validation system 110 includes one or more central processing unit ("CPU") 708, which may each include a conventional or proprietary microprocessor. The pre-validation system 110 further includes one or more memory 712, such as random access memory ("RAM") for temporary storage of information, one or more read only memory ("ROM") for permanent storage of information, and one or more mass storage device 702, such as a hard drive, diskette, solid state drive, or optical media storage device. Typically, the modules of the pre-validation system 110 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of pre-validation system 110 may be combined into fewer components and modules or further separated into additional components and modules.

The pre-validation system 110 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the pre-validation system 110 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary pre-validation system 110 may include one or more commonly available input/output (I/O) devices and interfaces 710, such as a keyboard, mouse, touchpad, and printer. In one embodiment, the I/O devices and interfaces 710 include one or more display devices, such as a monitor, that allows the visual presentation of data to a user. More particularly, a display device provides for the presentation of GUIs, application software data, and multimedia presentations, for example. The pre-validation system 110 may also include one or more multimedia devices 704, such as speakers, video cards, graphics accelerators, and microphones, for example.

In the embodiment of FIG. 6, the I/O devices and interfaces 710 provide a communication interface to various external devices. In the embodiment of FIG. 6, the pre-validation system 110 is electronically coupled to networks 160, which comprises one or more of a LAN, WAN, and/or the Internet, for example, via a wired, wireless, or combination of wired and wireless, communication link.

User devices, as discussed in various examples herein, may comprise software and/or hardware that implements a user interface module, may be an end user computing device that comprises one or more processors able to execute programmatic instructions. In some embodiments, user devices comprise a touch screen that allows a user to communicate input to the device using their finger(s) or a stylus on a display screen. User devices may comprise storage systems such as a hard drive or memory, or comprise any other non-transitory data storage medium. The storage systems may be configured to store executable instructions that may be executed by one or more processors to perform computerized operations on the user device, such as accept data input from a user (e.g., on the touch screen), and/or provide output to a user using the display. These executable instructions may be transmitted to another device for execution or processing by the device to implement the systems and methods described herein.

The user device may also comprise one or more user program applications, such as a mobile "app" (e.g. iPhone or Android app) that may be used to visualize data, and initiate the sending and receiving of messages in the loan finder system. This app may be distributed (e.g. downloaded) over the network to the user computing device directly from a credit bureau, a digital targeting system, a digital display entity, or from various third parties such as an Apple iTunes or Google Play repository or "app store." In some embodiments, the application may comprise a set of visual interfaces that may comprise templates to display advertisement information (e.g., information regarding an offer of the offer provider). In some embodiments, as described herein, visual user interfaces may be downloaded from another server or service. This may comprise downloading web page or other HTTP/HTTPS data from a web server and rendering it through the "app". In some embodiments, no special "app" need be downloaded and the entire interface may be transmitted from a remote Internet server to a user device, such as transmission from a web server that is a part of the digital targeting system to an iPad, and rendered within the iPad's browser.

Additional Embodiments

Although the foregoing systems and methods have been described in terms of certain embodiments, other embodiments will be apparent to those of ordinary skill in the art from the disclosure herein. Additionally, the methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Other combinations, omissions, substitutions and modifications will be apparent to the skilled artisan in view of the disclosure herein. The various features and processes described above may be used independently of one another, or may be combined in various ways. All possible combinations and sub-combinations are intended to fall within the scope of this disclosure. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps (or blocks) are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

All of the processes described herein may be embodied in, and fully automated via, software code modules executed by one or more general purpose computers or processors. The code modules may be stored in any type of non-transitory computer-readable medium or computer storage device, such as hard drives, solid state memory, optical disc, and/or the like, or another computer storage device. Some or all the methods may alternatively be embodied in specialized computer hardware. In addition, the components referred to herein may be implemented in hardware, software, firmware or a combination thereof. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved, as would be understood by those skilled in the art.

The term "database," as used herein, may refer to a database (e.g., RDBMS or SQL database), or may refer to any other data structure, such as, for example a comma separated values (CSV), eXtendible Markup Language (XML), TeXT (TXT) file, flat file, spreadsheet file, and/or any other widely used or proprietary format. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In general, the word module, as used herein, refers to logic embodied in hardware or firmware, or to a collection of software instructions, possibly having entry and exit points, written in a programming language such as, for example, Java, Lua, C, C++, C#. Software modules may be compiled and linked into an executable program, installed in a dynamic link library, or may be written in an interpreted programming language such as, for example, BASIC, Java, Perl, or Python. It will be appreciated that software modules may be callable from other modules or from themselves or may be invoked in response to detected events and interrupts, or both. The modules included in the system may be stored in the mass storage device as executable software codes that are executed by a CPU. Modules in the system may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein may be preferably implemented as software modules, but may be represented in hardware or firmware. Generally, the modules described herein refer to logical modules that may be combined with other modules or devices into sub-modules despite their physical organization or storage.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for displaying offers to customers of a digital display entity, the system comprising:
   a pre-validation system comprising one or more processors for executing software instructions to:
      receive pre-validation criteria indicating attributes of users that qualify them for a content item from a provider;
      access a regulated database of regulated user records including, for each of a plurality of users, a user ID and a plurality of regulated user attributes, wherein access to the regulated user records is regulated by third-party regulations;
      for each of the user IDs:
         determine whether the plurality of regulated user attributes of the regulated user record meet the pre-validation criteria;
         if the pre-validation criteria are met, identify the user ID as pre-validated; and
         if the pre-validation criteria are not met, do not identify the user ID as pre-validated;
      generate a pre-validated user ID list including each of the pre-validated user IDs, wherein the pre-validated user ID list does not include any regulated user attributes from the regulated database; and
      transmit the pre-validated user ID list to a targeting system;
   the targeting system comprising one or more processors for executing software instructions to:
      receive the pre-validated user ID list from the pre-validation system;
      receive, from a third-party digital display entity, a digital entity database indicating a plurality of digital user records associated with respective users of a service provided by the digital display entity, each of the digital user records including a digital ID and personal information of the associated user, the digital IDs assigned by the third-party digital display entity and usable to uniquely identify users accessing the service provided by the digital display entity;
      search a targeting database for personal user information matching personal information of respective digital user records;

if matching personal user information is identified in the targeting database, add the corresponding digital ID to a digital ID list;

if matching personal user information is not identified in the targeting database, do not add the corresponding digital ID to the digital ID list; and wherein the digital ID list is configured to allow the digital display entity that comprises a non-transitory computer storage medium storing software instructions to identify respective users as qualifying for the content item from the provider in response to the users' digital IDs being included on the digital ID list and to initiate transmission of a firm offer of goods or services to the identified users.

2. The system of claim 1, wherein the digital display entity is configured to transmit the content item to qualifying users by audio channels, visual channels, application channels, or electronic mail channels, wherein the content item comprises one of a credit card offer, an auto loan offer, a home mortgage offer, a personal loan offer, an insurance offer, or a service offer.

3. The system of claim 1, wherein each digital ID includes an email address, and the digital display entity transmits the content item to qualifying digital IDs via respective email addresses.

4. The system of claim 1, wherein identifying a user ID as pre-validated comprises associating a flag with the pre-validated user ID, wherein the pre-validated user IDs in the pre-validated ID list are identifiable based on associations with the flag.

5. A system for displaying offers to customers of a digital display entity, the system comprising:

a pre-validation system comprising one or more processors for executing software instructions to:

receive pre-validation criteria indicating attributes of users that qualify them for a content item from a provider;

access a regulated database of regulated user records including, for each of a plurality of users, a regulated user ID and a plurality of regulated user attributes, wherein access to the regulated user records is regulated by third-party regulations;

receive from an external targeting system that comprises a non-transitory computer readable medium storing software instructions, a targeting database comprising a plurality of targeting records associated with respective users, each targeting record including a user ID and associated personal user information;

for respective user IDs of the targeting database:

correlate the user ID with a regulated user record of the regulated database based at least on one or more matches of personal user information associated with the user IDs and corresponding regulated user attributes of the regulated user records;

determine whether the regulated user attributes of the regulated user record identified as matching the user ID of the targeting database meet the pre-validation criteria;

if the pre-validation criteria are met, identify the user ID as pre-validated; and if the pre-validation criteria are not met, do not identify the user ID as pre-validated;

generate a pre-validated user ID list including each of the pre-validated user IDs, wherein the pre-validated user ID list does not include any regulated user attributes from the regulated database; and transmit the pre-validated user ID list to the digital display entity;

wherein the digital display entity comprises a non-transitory computer storage medium storing software instructions to match respective pre-validated user IDs to corresponding digital IDs of the digital display entity to generate a digital ID list configured to allow the digital display entity to identify respective users as qualifying for the content item from the provider in response to the users' digital IDs being included on the digital ID list;

a verification system comprising one or more processors for executing software instructions to:

receive an indication that a user selected the content item displayed by the digital display entity;

transmit, to a user device associated with the user, a request for user authentication information;

receive, from the user device, the user authentication information;

searching the pre-validated user ID list for the user authentication information; and in response to identifying the user authentication information associated with a pre-validated user ID in the pre-validated user ID list, initiating transmission of a firm offer of goods or services to the user device; or in response to not identifying the user authentication information associated with a pre-validated user ID in the pre-validated user ID list, not initiating transmission of a firm offer of goods or services to the user device.

6. The system of claim 5, wherein the verification system and the pre-validation system are operated by a same entity.

7. The system of claim 5, wherein the verification system and the pre-validation system are operated by different entities.

8. The system of claim 5, further comprising:

if the user authentication information is not identified in the pre-validated user ID list, initiating a prequalification process comprising:

transmit, to the user device, a request to access regulated user attributes of the user;

access the regulated user attributes of the user from the regulated database;

determine whether the regulated user attributes of the user meet the pre-validation criteria or alternative qualification criteria of the provider; and if the regulated user attributes of the user meet the pre-validation criteria or the alternative qualification criteria of the provider, initiating transmission of an offer of goods or services to the user device; or if the regulated user attributes of the user do not meet the pre-validation criteria or the alternative qualification criteria of the provider, not initiating transmission of a firm offer of goods or services to the user device.

9. The system of claim 5, wherein the user authentication information comprises name and address of the user.

10. The system of claim 5, wherein the verification system determines a confidence level of authentication based on the user authentication information and authenticates the users only if the confidence level exceeds a predetermined threshold.

11. A system for displaying offers to customers of a digital display entity, the system comprising:

one or more non-transitory computer readable medium
storing software instructions;
one or more computer processors configured to execute
the software instructions to perform:
a pre-validation process comprising:
receive pre-validation criteria indicating attributes of
users that qualify them for a content item from a
provider;
access a regulated database of regulated user records
including, for each of a plurality of users, a user ID
and a plurality of regulated user attributes,
wherein access to the regulated user records is
regulated by third-party regulations;
for each of the user IDs:
determine whether the plurality of regulated user
attributes of the regulated user record meet the
pre-validation criteria;
if the pre-validation criteria are met, identify the
user ID as pre-validated; and
if the pre-validation criteria are not met, do not
identify the user ID as pre-validated;
generate a pre-validated user ID list including each
of the pre-validated user IDs, wherein the pre-
validated user ID list does not include any regu-
lated user attributes from the regulated database;
and
transmit the pre-validated user ID list to a targeting
system;
a targeting process comprising:
receive the pre-validated user ID list from a pre-
validation system;
receive, from a third-party digital display entity, a
digital entity database indicating a plurality of
digital user records associated with respective
users of a service provided by the digital display
entity, each of the digital user records including a
digital ID and personal information of the associ-
ated user, the digital IDs assigned by the third-
party digital display entity and usable to uniquely
identify users accessing the service provided by
the digital display entity;
search a targeting database for personal user infor-
mation matching personal information of respec-
tive digital user records;
if matching personal user information is identified in
the targeting database, add the corresponding digi-
tal ID to a digital ID list;
if matching personal user information is not identi-
fied in the targeting database, do not add the
corresponding digital ID to the digital ID list; and
wherein the digital ID list is configured to allow the
digital display entity that comprises a non-transi-
tory computer storage medium storing software
instructions to identify respective users as quali-
fying for the content item from the provider in
response to the users' digital IDs being included
on the digital ID list and to initiate transmission of
a firm offer of goods or services to the identified
users.

12. The system of claim 11, wherein the digital display
entity is configured to transmit the content item to qualifying
users by audio channels, visual channels, application chan-
nels, or electronic mail channels; wherein the content item
comprises an insurance offer and the provider is an insurance
provider.

13. The system of claim 11, wherein each digital ID
includes an email address, and the digital display entity
transmits the content item to qualifying digital IDs via
respective email addresses.

14. The system of claim 11, wherein identifying a user ID
as pre-validated comprises associating a flag with the pre-
validated user ID, wherein the pre-validated user IDs in the
pre-validated ID list are identifiable based on associations
with the flag.

15. A system for displaying offers to customers of a digital
display entity, the system comprising:
one or more non-transitory computer readable medium
storing software instructions;
one or more computer processors configured to execute
the software instructions to perform:
a pre-validation process comprising:
receive pre-validation criteria indicating attributes of
users that qualify them for a content item from a
provider;
access a regulated database of regulated user records
including, for each of a plurality of users, a
regulated user ID and a plurality of regulated user
attributes, wherein access to the regulated user
records is regulated by third-party regulations;
receive from an external targeting system that com-
prises a non-transitory computer readable medium
storing software instructions, a targeting database
comprising a plurality of targeting records asso-
ciated with respective users, each targeting record
including a user ID and associated personal user
information;
for respective user IDs of the targeting database:
correlate the user ID with a regulated user record
of the regulated database based at least on one
or more matches of personal user information
associated with the user IDs and corresponding
of regulated user attributes of the regulated user
records;
determine whether the regulated user attributes of the
regulated user record identified as matching the
user ID of the targeting database meet the pre-
validation criteria;
if the pre-validation criteria are met, identify the user
ID as pre-validated; and
if the pre-validation criteria are not met, do not
identify the user ID as pre-validated;
generate a pre-validated user ID list including each
of the pre-validated user IDs, wherein the pre-
validated user ID list does not include any regu-
lated user attributes from the regulated database;
and
transmit the pre-validated user ID list to the digital
display entity;
wherein the digital display entity comprises a non-
transitory computer storage medium storing software
instructions to match respective pre-validated user
IDs to corresponding digital IDs of the digital dis-
play entity to generate a digital ID list configured to
allow the digital display entity to identify respective
users as qualifying for the content item from the
provider in response to the users' digital IDs being
included on the digital ID list;
a verification process comprising:
receive an indication that a user selected the content
item displayed by the digital display entity;
transmit, to a user device associated with the user, a
request for user authentication information;

receive, from the user device, the user authentication information;

searching the pre-validated user ID list for the user authentication information; and in response to identifying the user authentication information associated with a pre-validated user ID in the pre-validated user ID list, initiating transmission of a firm offer of goods or services to the user device; or in response to not identifying the user authentication information associated with a pre-validated user ID in the pre-validated user ID list, not initiating transmission of a firm offer of goods or services to the user device.

16. The system of claim 15, wherein the verification system and the pre-validation system are operated by a same entity.

17. The system of claim 15, wherein the verification system and the pre-validation system are operated by different entities.

18. The system of claim 15, further comprising:

if the user authentication information is not identified in the pre-validated user ID list, initiating a prequalification process comprising:

transmit, to the user device, a request to access regulated user attributes of the user;

access the regulated user attributes of the user from the regulated database;

determine whether the regulated user attributes of the user meet the pre-validation criteria or alternative qualification criteria of the provider; and if the regulated user attributes of the user meet the pre-validation criteria or the alternative qualification criteria of the provider, initiating transmission of an offer of goods or services to the user device; or if the regulated user attributes of the user do not meet the pre-validation criteria or the alternative qualification criteria of the provider, not initiating transmission of a firm offer of goods or services to the user device.

19. The system of claim 15, wherein the user authentication information comprises name and address of the user.

20. The system of claim 15, wherein the verification system determines a confidence level of authentication based on the user authentication information and authenticates the users only if the confidence level exceeds a predetermined threshold.

* * * * *